US007798586B2

(12) United States Patent
Watanabe

(10) Patent No.: US 7,798,586 B2
(45) Date of Patent: Sep. 21, 2010

(54) REMAINING AMOUNT DETECTION SENSOR AND INK-JET PRINTER USING THE SAME

(75) Inventor: Toshiaki Watanabe, Chiba (JP)

(73) Assignee: SII Printek Inc. (JP)

( * ) Notice: Subject to any disclaimer, the term of this patent is extended or adjusted under 35 U.S.C. 154(b) by 382 days.

(21) Appl. No.: 12/070,330

(22) Filed: Feb. 14, 2008

(65) Prior Publication Data

US 2009/0040262 A1 Feb. 12, 2009

(30) Foreign Application Priority Data

Feb. 23, 2007 (JP) ............................. 2007-043651
Dec. 4, 2007 (JP) ............................. 2007-313514

(51) Int. Cl.
*B41J 2/195* (2006.01)
*B41J 2/30* (2006.01)
*B41J 29/393* (2006.01)
*B41J 2/175* (2006.01)
*G01F 23/00* (2006.01)

(52) U.S. Cl. ............................... 347/7; 347/14; 347/17; 347/19; 347/86; 347/87; 73/290 R

(58) Field of Classification Search ..................... 347/7, 347/14, 17, 19, 86, 87; 73/290 R
See application file for complete search history.

(56) References Cited

U.S. PATENT DOCUMENTS 3,879,644 A 4/1975 Maltby ....................... 317/246
4,749,988 A 6/1988 Berman et al. .............. 340/618
4,757,252 A 7/1988 Maltby et al. ................. 324/61
5,682,184 A * 10/1997 Stephany et al. ............... 347/7
2005/0156962 A1* 7/2005 Sasaki et al. ................... 347/7

FOREIGN PATENT DOCUMENTS

JP 8197749 8/1996
JP 9166474 6/1997

* cited by examiner

*Primary Examiner*—Charlie Peng
*Assistant Examiner*—Hung Lam
(74) *Attorney, Agent, or Firm*—Adams & Wilks

(57) ABSTRACT

Provided is a remaining amount detection sensor (4) which is disposed outside a sub-tank (3) to detect a remaining amount of an ink (20), including: a detection electrode (4*a*) disposed so as to face the sub-tank (3); a guard electrode (4*b*) disposed in the same plane as the detection electrode (4*a*) so as to surround an outer periphery of the detection electrode (4*a*); and a guard electrode (4*d*) which is disposed so as to face the detection electrode (4*a*) with a space in at least a range covering the detection electrode (4*a*), and has the same potential as that of the guard electrode (4*b*), in which the remaining amount of the content of the sub-tank (3) can be detected based on a capacitance to be measured by the detection electrode (4*a*) with the potentials of the guard electrodes (4*b*) (4*d*) each being set as a reference potential. Accordingly, in the remaining amount detection sensor and the ink-jet printer using the same, the remaining amount of the content of the container can be detected with high accuracy.

18 Claims, 17 Drawing Sheets

REMAINING AMOUNT DETECTION SENSOR AND INK-JET PRINTER USING THE SAME

BACKGROUND OF THE INVENTION

1. Field of the Invention

The present invention relates to a remaining amount detection sensor for detecting a remaining amount of content of a container, and an ink-jet printer using the same.

2. Description of the Related Art

Up to now, there have been known various remaining amount detection sensors for detecting a remaining amount of content, such as liquid and powder, contained in a container.

For example, in an ink-jet printer for performing image recording and the like by discharging ink from an ink-jet head, a remaining amount of ink contained in an ink tank for supplying ink to the ink-jet head is monitored. Then, when the ink remaining amount decreases, ink is replenished from an ink replenishment tank, and in a case where the ink tank is a replaceable cartridge, it is notified that a time for replacement of the ink tank approaches. Further, there has been known that a remaining amount detection sensor of a capacitance type is disposed outside the ink tank, thereby detecting the ink remaining amount.

For example, JP 08-197749A discloses an ink-jet printer which includes an ink tank for storing conductive ink, electrodes for outside of the container, and the two detection electrodes sandwiching the container are affected by other conductive structures and electrical circuits disposed on the periphery of the detection circuit, so there arises a problem in that the capacitance is changed due to a change in surrounding environments and the like, and a measurement error or erroneous detection occurs.

In particular, in the case of the ink-jet printer, the change in capacitance of the ink tank due to the change in remaining amount of the ink to be detected is generally extremely small. Accordingly, the noise due to the external factors has a large effect on the measurement accuracy.

Further, in many cases, the ink tank of the ink-jet printer is disposed near the electrical circuit for controlling discharge of the ink-jet head and controlling a movement mechanism and the like of the ink-jet head, is movably held on a recording medium, and is disposed near a movable member. As a result, an amount of noise to be generated due to the external factors is increased.

In addition, in the ink-jet printer, ink tanks for each color are prepared for color recording, and the ink tanks are arranged in parallel with each other. As a result, detection electrodes for the ink tanks for different colors are adjacent to each other. For this reason, the capacitance is formed also between detection electrodes of another adjacent remaining amount detection sensor, which causes an increase in measurement error.

In order to eliminate the effects of the surrounding environments, the remaining amount detection sensor and the ink tanks can be disposed to be spaced apart from other members and other remaining amount detection sensors which affect the capacitance, but there arises another problem in that the apparatus is increased in size.

SUMMARY OF THE INVENTION

The present invention has been made in view of the above-mentioned problems, and therefore an object of the present invention is to provide a remaining amount detection sensor capable of detecting a remaining amount of content of a container with high accuracy, and an ink-jet printer using the same.

In order to solve the problems, according to a first aspect of the present invention, there is provided a remaining amount detection sensor which is disposed outside a container to detect a remaining amount of content of the container, including: a detection electrode disposed so as to face the container; a first guard electrode disposed in the same plane as the detection electrode so as to surround an outer periphery of the detection electrode; and a second guard electrode which is disposed so as to face the detection electrode with a space in at least a range covering the detection electrode, and has the same potential as that of the first guard electrode, in which the remaining amount of the content of the container can be detected based on a capacitance to be measured by the detection electrode with the potentials of the first guard electrode and the second electrode each being set as a reference potential.

In the first aspect of the present invention, the detection electrode is disposed so as to face the container. Further, the first guard electrode surrounds the outer periphery of the detection electrode. The second guard electrode, which has the same potential as that of the first guard electrode, is disposed so as to face the detection electrode with a space in at least the range covering the detection electrode. As a result, effects of the arrangement of the components on a side of the detection electrode and on a rear side at which the second guard electrode is positioned, and of an external electric field, on the capacitance of the detection electrode can be blocked or reduced. Accordingly, the capacitance of the container, which is positioned near the surface of the detection electrode, and the capacitance of the content of the container can be detected with high accuracy.

According to a second aspect of the present invention, in the remaining amount detection sensor according to the first aspect of the present invention, the detection electrode includes a plurality of the detection electrodes formed at positions spaced apart from each other; the first guard electrode is in a state of surrounding an outer periphery of each of the plurality of detection electrodes; and the remaining amount of the content of the container can be detected in a plurality of levels based on capacitances to be measured by the plurality of detection electrodes.

In the second aspect of the present invention, the first guard electrode is in the state of surrounding the outer periphery of each of the plurality of detection electrodes disposed at positions spaced apart from each other. Accordingly, each of the detection electrodes does not affect the measurement of the capacitance by each of the detection electrodes. The remaining amount of the content at each arrangement position can be detected by each of the detection electrodes, thereby making it possible to detect the remaining amount of the content in a plurality of levels with high accuracy.

According to a third aspect of the present invention, the remaining amount detection sensor according to the first or the second aspect of the present invention, further includes: a third guard electrode which has the same potential as that of each of the first guard electrode and the second guard electrode, and is disposed so as to face at least one of the first guard electrode and the second guard electrode with a space on an opposite side of the container; and a reference electrode disposed so as to be sandwiched in a range in which one of the first guard electrode and the second guard electrode, and the third electrode are opposed to each other.

In the third aspect of the present invention, a reference electrode is sandwiched in the range in which at least one of the first guard electrode and the second guard electrode, and the third guard electrode, thereby being shielded from the external electric field, and is integrally formed on the side or on the rear side of the detection part which is formed of the detection electrode and the first and second guard electrodes. As a result, through the measurement of the capacitance of the reference electrode, effects of the environmental factors on the detection electrode and the reference electrode, for example, the fluctuation of the capacitance near the remaining amount detection sensor due to temperature and humidity can be detected.

Accordingly, for example, by converting the fluctuation of the capacitance detected by the reference electrode into the fluctuation of the capacitance of the detection electrode so as to obtain a difference therebetween, a noise component due to the environmental factors can be eliminated.

According to a fourth aspect of the present invention, in the remaining amount detection sensor according to the third aspect of the present invention, the reference electrode is disposed in a range in which the first guard electrode and the third guard electrode are opposed to each other, and is disposed in the same plane as the second guard electrode.

In the fourth aspect of the present invention, the reference electrode is disposed in the same plane as the second guard electrode. Accordingly, a thinner remaining amount detection sensor can be formed as compared with a case of forming the reference electrode between the second guard electrode and the third guard electrode.

Further, when the reference electrode is disposed in the same plane as the second guard electrode, the reference electrode and the second guard electrode can be formed as a conductive pattern in the same layer of the multilayer printed board, thereby making it possible to use a multilayer printed board with a small number of layers.

According to a fifth aspect of the present invention, in the remaining amount detection sensor according to the third aspect of the present invention, the second guard electrode is disposed in a range covering each of the detection electrode and the first guard electrode; the third guard electrode is disposed in a range covering the second guard electrode; and the reference electrode is disposed so as to be sandwiched in a range in which the second guard electrode and the third guard electrode are opposed to each other.

In the fifth aspect of the present invention, the reference electrode is sandwiched between the second and third guard electrode, thereby being shielded from the external electric field, and is integrally formed on the rear surface of the detection part formed of the detection electrode and the first and second guard electrodes. As a result, through the measurement of the capacitance of the reference electrode, the effects of the environmental factors on the detection electrode and the reference electrode, for example, the fluctuation of the capacitance near the remaining amount detection sensor due to temperature and humidity can be detected.

Accordingly, for example, by converting the fluctuation of the capacitance detected by the reference electrode into the fluctuation of the capacitance of the detection electrode so as to obtain a difference therebetween, a noise component due to the environmental factors can be eliminated.

In this case, the second guard electrode is formed in the region covering the detection electrode and the first guard electrode, and the third guard electrode is formed in the range covering the second guard electrode, thereby more reliably reducing the effects of the environmental factors on the detection electrode and the reference electrode.

According to a sixth aspect of the present invention, in the remaining amount detection sensor according to the first aspect or the second aspect of the present invention, the detection electrode, the first guard electrode, and the second guard electrode are each formed as a conductive pattern of a multilayer printed board; and the multilayer printed board has a remaining amount detection circuit integrally formed thereon, for measuring the capacitance of the detection electrode to generate a remaining amount detection output.

In the sixth aspect of the present invention, the sensor part formed of the detection electrode and the first and second guard electrodes, and the remaining amount detection circuit are integrally formed on the multilayer printed board. As a result, the wiring from the detection electrode is shortened, and a remaining amount detection sensor resistant to noise can be formed.

According to a seventh aspect of the present invention, in the remaining amount detection sensor according to any one of the third to fifth aspects of the present invention, the detection electrode, the first guard electrode, the second guard electrode, the third guard electrode, and the reference electrode are each formed as a conductive pattern of a multilayer printed board; and the multilayer printed board has a remaining amount detection circuit integrally formed thereon, for measuring the capacitance of the detection electrode to generate a remaining amount detection output.

In the seventh aspect of the present invention, the detection electrode, the first guard electrode, the second guard electrode, the third guard electrode, and the reference electrode are each formed as the conductive pattern on the multilayer printed board. Accordingly, the sensor part formed of the detection electrode and the first and second guard electrodes, and a reference capacitor formed of the reference electrode sandwiched between one of the first guard electrode and the second guard electrode, and the third guard electrode are integrally formed, and can be integrally formed with the remaining amount detection circuit. As a result, the wiring from the detection electrode is shortened, and the remaining amount detection sensor resistant to noise can be formed.

In this case, in the case of forming the remaining amount detection circuit as a ΔC-V conversion circuit, the reference electrode enables formation of a reference capacitor resistant to noise and environmental fluctuation. Accordingly, a compact remaining amount detection sensor with higher accuracy can be obtained.

According to an eighth aspect of the present invention, an ink-jet printer, includes: an ink-jet head for discharging ink; an ink tank for supplying the ink to the ink-jet head; and the remaining amount detection sensor according to any one of the first to seventh aspects of the present invention, which is disposed outside the ink tank.

In the eighth aspect of the present invention, the remaining amount detection sensor according to any one of the first to seventh aspects of the present invention is provided. As a result, the same operations and effects as those described in any one of the first to seventh aspects of the present invention are obtained.

In the remaining amount detection sensor according to the present invention and the ink-jet printer using the same, the effects on the capacitance of the detection electrode from the side and the rear side thereof can be blocked or reduced. As a result, it is possible to obtain an effect in that the remaining amount of the content of the container, which the detection electrode faces, can be detected with high accuracy.

DETAILED DESCRIPTION OF THE PREFERRED EMBODIMENTS

Hereinafter, embodiments of the present invention will be described with reference to the accompanying drawings. In all the drawings, identical or corresponding components in different embodiments are denoted by the same reference symbols unless otherwise specified, and a redundant description thereof is omitted.

First Embodiment

A description is given of a remaining amount detection sensor according to a first embodiment of the present invention as well as an ink-jet printer using the same.

Figure 1:
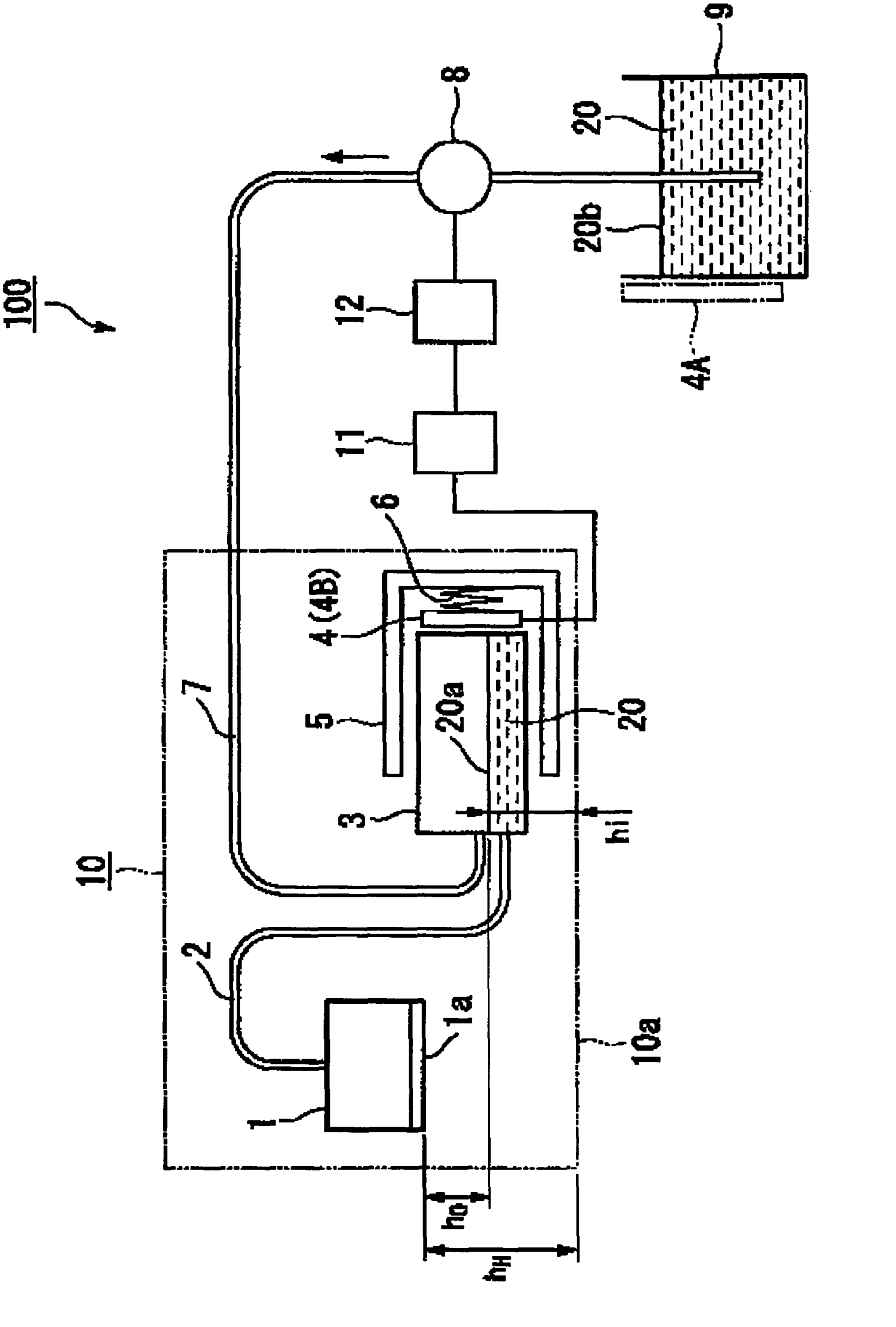
FIG. 1 is an explanatory block diagram schematically showing a general structure of an ink-jet printer using a remaining amount detection sensor according to a first embodiment of the present invention.
Figure 2:
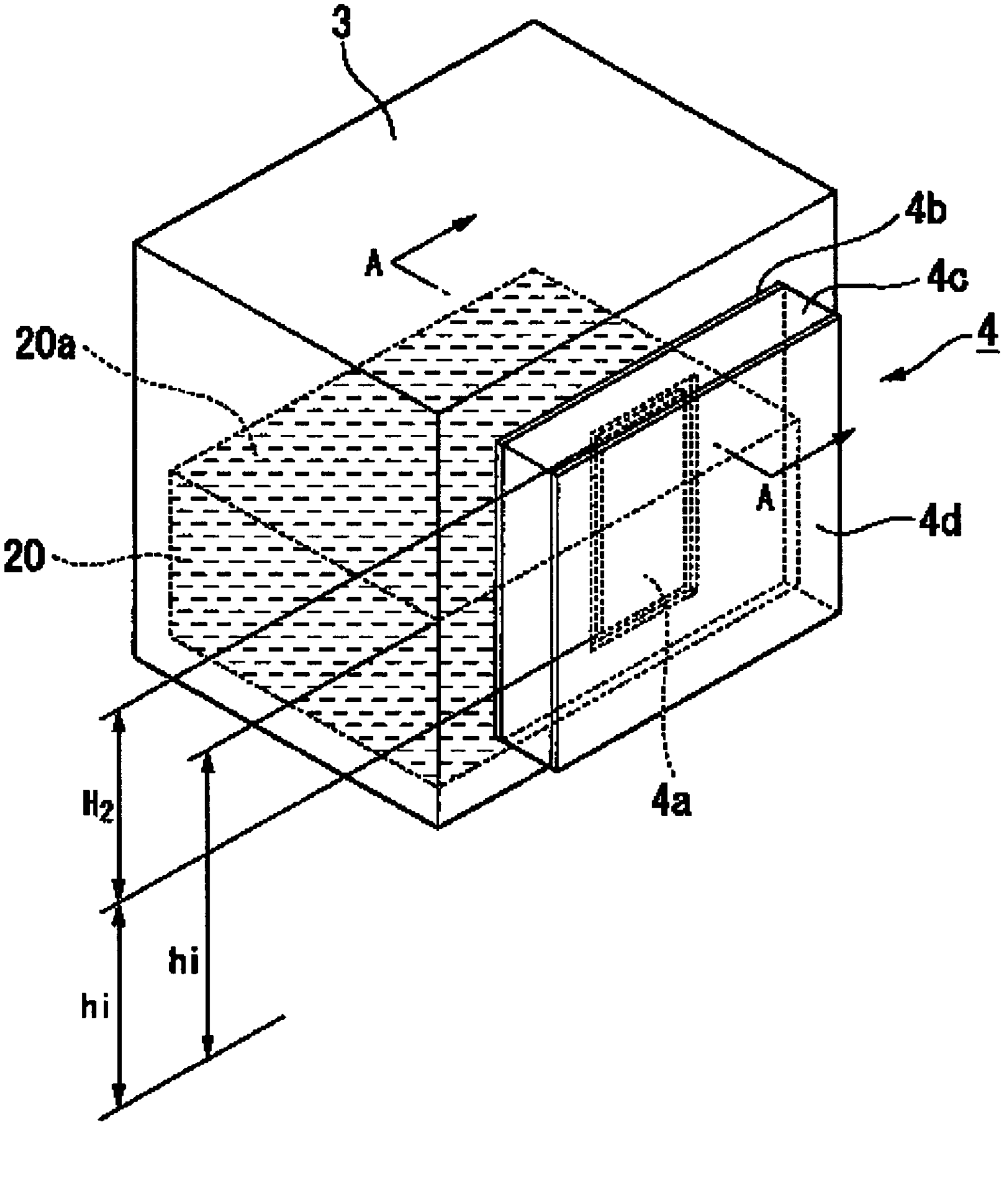
FIG. 2 is a perspective view showing an arrangement state of the remaining amount detection sensor according to the first embodiment of the present invention.
Figure 3:
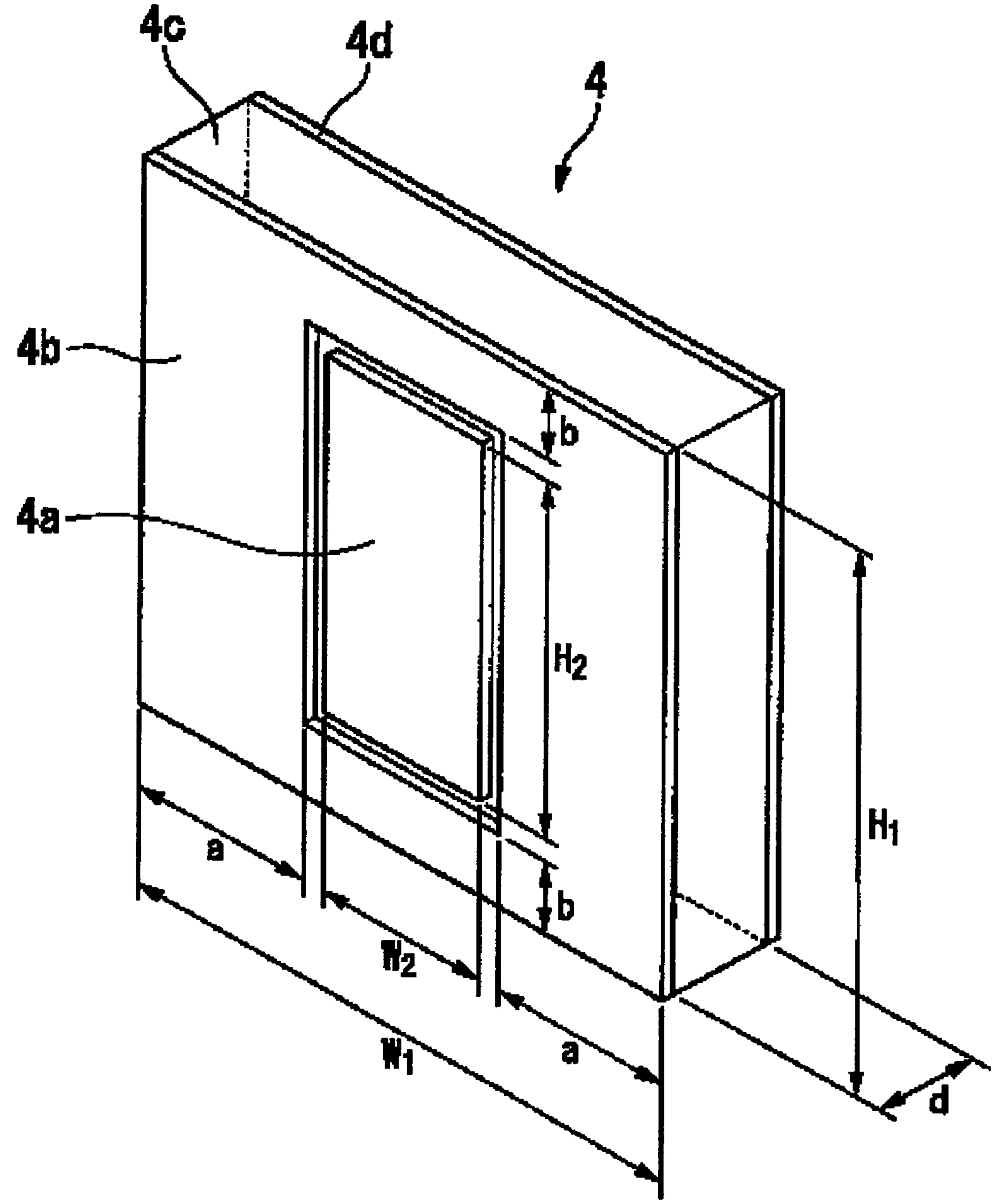
FIG. 3 is a perspective view showing a structure of the remaining amount detection sensor according to the first embodiment of the present invention.
Figure 4:
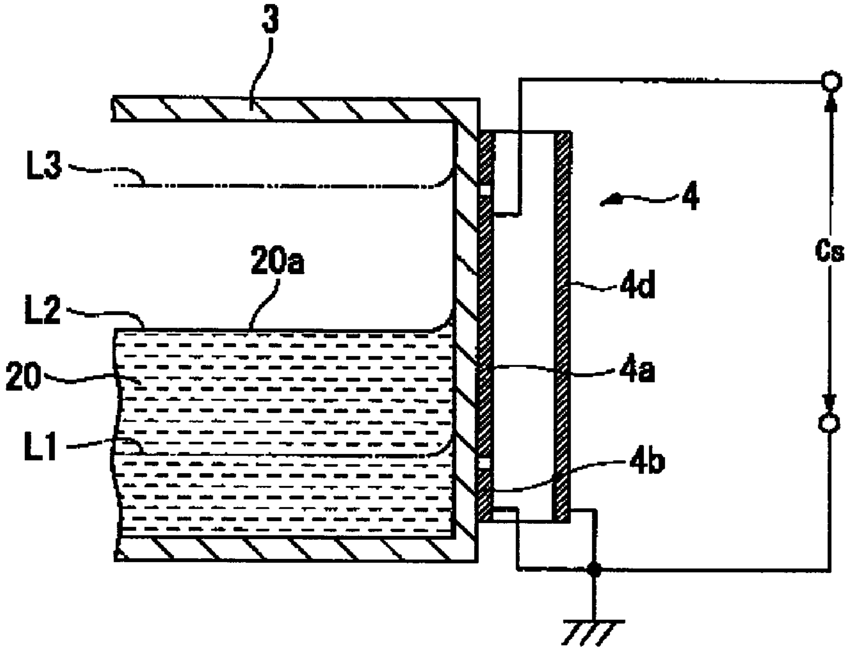
FIG. 4 is a cross-sectional diagram of the remaining amount detection sensor according to the first embodiment of the present invention taken along the line A-A of FIG. 2.
Figure 5:
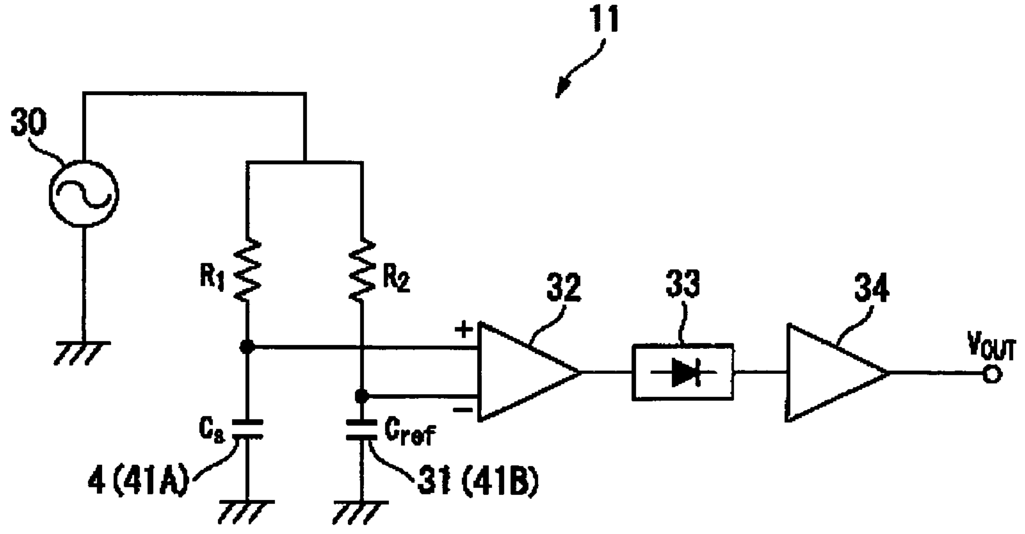
FIG. 5 is a circuit diagram showing an example of a remaining amount detection circuit for taking out an output voltage from the remaining amount detection sensor according to the first embodiment of the present invention.

FIG. 1 is an explanatory block diagram schematically showing a general structure of the ink-jet printer using the remaining amount detection sensor according to the first embodiment of the present invention. FIG. 2 is a perspective view showing an arrangement state of the remaining amount detection sensor according to the first embodiment of the present invention. FIG. 3 is a perspective view showing a structure of the remaining amount detection sensor according to the first embodiment of the present invention. FIG. 4 is a cross-sectional diagram of the remaining amount detection sensor according to the first embodiment of the present invention taken along the line A-A of FIG. 2. FIG. 5 is a circuit diagram showing an example of a remaining amount detection circuit for taking out an output voltage from the remaining amount detection sensor according to the first embodiment of the present invention.

As shown in FIG. 1, an ink-jet printer 100 according to the first embodiment of the present invention includes an ink-jet head 1, a sub-tank 3 (ink tank), a sensor holder 5, a remaining amount detection sensor 4, which are accommodated in a carriage 10 held so as to be relatively movable with respect to a surface of a recording medium (not shown), and a main tank 9 for supplying an ink 20 to the sub-tank 3. The ink-jet printer 100 performs image recording and the like by discharging ink droplets toward the recording medium.

The ink-jet head 1 discharges ink droplets toward the recording medium from a head surface 1*a* on which a plurality of ink nozzles are arranged, and includes, inside thereof, known structures (not shown) such as an ink chamber and an ink discharge mechanism using a piezoelectric element.

The ink-jet head 1 is connected to the sub-tank 3 through an ink tube 2 so as to be supplied with the ink 20 from the sub-tank 3.

The ink-jet head 1 is fixed at a position of a height $h_H$ from a bottom surface 10*a* which is a reference surface of the carriage 10 in a height direction thereof.

The sub-tank 3 is a container for storing a certain amount of the ink 20 as the content so as to supply the ink 20 to the ink-jet head 1 from a position near the ink-jet head 1. For example, there can be employed a sub-tank having a rectangular parallelepiped outer shape made of polyethylene resin or the like with a thickness of 1 mm.

To an upper side of the sub-tank 3 an ink tube 7 for introducing the ink 20 from the main tank 9 is connected, and to a lower side thereof, the ink tube 2 for supplying the stored ink 20 to the ink-jet head 1 is connected.

The sub-tank 3 is detachably held by the sensor holder 5 which is fixed at a predetermined position in the carriage 10, and is fixed to be positioned with respect to the sensor holder 5 when the sub-tank 3 is mounted thereto.

Note that, for ease of explanation, a single sub-tank 3 is illustrated in the following description and the drawings. However, in a case of performing color printing, a plurality of sub-tanks 3 having the same structure are arranged in parallel with each other according to the number of colors of the ink 20.

The sensor holder 5 is a holding member for detachably fixing the sub-tank 3 and for performing positioning of the sub-tank 3 in the carriage 10. Inside the sensor holder 5, there is provided the remaining amount detection sensor 4 which is urged by a pressure spring 6 to be brought into close contact with a side surface of the sub-tank 3 being mounted.

A height of the sensor holder 5 being mounted is set so that a given meniscus shape is formed at the ink nozzles formed on the head surface 1*a* and an ink liquid level 20*a* in the sub-tank 3 is lower than the head surface 1*a*. In other words, a height $h_i$ of a bottom surface 10*a*, which is measured from the bottom surface 10*a* of the carriage 10, is represented as $h_i<h_H$.

As shown in FIG. 2, the remaining amount detection sensor 4 is disposed outside the side surface of the sub-tank 3, and detects the height of the ink liquid level 20*a* by measuring a capacitance on a side of the sub-tank 3, thereby detecting the remaining amount of the ink 20 contained in the sub-tank 3.

As shown in FIGS. 2 to 4, the remaining amount detection sensor 4 has a structure in which an electrode pattern which is formed of a detection electrode 4*a* and a guard electrode 4*b* (first guard electrode), and a guard electrode 4*d* (second guard electrode) are disposed so as to face each other through a dielectric layer 4*c* with a thickness d. The remaining amount detection sensor 4 has a rectangular outer shape with a size of $W_1 \times H_1$ which can be contained within a range of the side surface of the sub-tank 3.

The remaining amount detection sensor 4 according to the first embodiment of the present invention is structured by using a double-sided printed board. In other words, a conductive pattern is formed on one substrate surface as the electrode pattern formed of the detection electrode 4*a* and the guard electrode 4*b*, and the guard electrode 4*d* is formed on the other substrate surface as a solid pattern. In addition, a base material of the printed board forms the dielectric layer 4*c*. As a material of the double-sided printed board, for example, a glass composite substrate and a glass epoxy substrate can be employed.

The detection electrode 4*a* is provided at a substantial center of the surface on which a rectangular conductor layer with a long side $H_2$ and a short side $W_2$ (note that $H_2<H_1$ and $W_2<W_1$) is brought into close contact with the remaining amount detection sensor 4, thereby enabling detection of a potential via wiring (not shown). The long side of the detection electrode 4*a* is placed along a height direction of the sub-tank 3, that is, a vertical direction in which the ink liquid level 20*a* rises or falls.

The guard electrode 4*b* is a conductive layer which is disposed in the same plane as the detection electrode 4*a* so as to surround an outer periphery of the detection electrode 4*a* and which is extended to an outer edge of the remaining amount detection sensor 4, that is, the rectangular outer shape having the size of $W_1 \times H_1$, and is grounded via wiring (not shown).

The guard electrode 4*d* is a conductive layer which faces the detection electrode 4*a* and the guard electrode 4*b* and which covers the detection electrode 4*a* and the guard electrode 4*b* to be extended to the outer edge of the remaining amount detection sensor 4, and is grounded via wiring (not shown).

As a result, as shown in FIG. 4, between the detection electrode 4*a* and the guard electrode 4*b*, and between the detection electrode 4*a* and the guard electrode 4*d*, there are formed capacitors having a combined capacitance of $C_S$.

As shown in FIG. 1, wiring connected to the detection electrode 4*a* and a ground wire connected to each of the guard electrodes 4*b* and 4*d* are electrically connected to a remaining amount detection circuit part 11 (remaining amount detection circuit) for detecting the capacitance of the detection electrode 4*a* to thereby detect the remaining amount in the sub-tank 3.

As long as a potential of the detection electrode 4*a* can be detected with a required accuracy, the remaining amount detection circuit part 11 may have any circuit configuration. In the first embodiment of the present invention, as an example, a ΔC-V conversion circuit as shown in FIG. 5 is employed.

The remaining amount detection circuit part 11 according to the first embodiment of the present invention outputs a voltage $V_{OUT}$ obtained by converting, into a voltage, a difference ΔC in capacitance of a reference capacitor 31 having the capacitance $C_S$ of the detection electrode 4*a* and a known capacitance $C_{ref}$. The remaining amount detection circuit part 11 includes an oscillator 30 for adding sine-wave signals to the remaining amount detection sensor 4 and the reference capacitor 31, a differential amplifier 32 for detecting a difference between the signals, a rectifier 33 for rectifying an output of the differential amplifier 32, and an amplifier 34 for amplifying the signals rectified by the rectifier 33. As the differential amplifier 32, there can be employed a typical operational amplifier for comparing and calculating a voltage amplitude difference and a voltage phase difference, which are generated between both ends of the capacitance $C_S$ and the capacitance $C_{ref}$, to output the difference.

In the remaining amount detection circuit part 11, the voltage $V_{OUT}$ corresponds to a phase difference amount which is generated according to the difference ΔC in capacitance between the detection electrode 4*a* and the reference capacitor 31. Accordingly, when $C_S=C_{ref}$ is satisfied, $V_{OUT}=0$ is established. A value of $V_{OUT}$ is used to calculate the difference ΔC, and the capacitance of the detection electrode 4*a* can be measured assuming that $C_S=C_{ref}+\Delta C$.

In the first embodiment of the present invention, the capacitance $C_{ref}$ of the reference capacitor 31 is set to a value equal to a capacitance $C_{S2}$ of the detection electrode 4*a* in a case where a position in the height direction with respect to the head surface 1*a* of the ink liquid level 20*a* in the sub-tank 3 matches an appropriate position L2 at which the given meniscus shape is formed at the ink nozzles of the ink-jet head 1.

The remaining amount detection circuit part 11 is electrically connected to a pump drive control part 12 for controlling a pump-up operation of a lift pump 8 connected to the ink tube 7, and the output voltage $V_{OUT}$ is sent to the pump drive control part 12.

The pump drive control part 12 can control driving, stopping, and a pump-up quantity of the lift pump 8 according to the position of the ink liquid level 20*a* to be detected based on the output voltage $V_{OUT}$ of the remaining amount detection circuit part 11.

For example, the pump drive control part 12 according to the first embodiment of the present invention performs the control in the following manner. When the output voltage $V_{OUT}$ is a negative value, that is, when the ink liquid level 20*a* is lower than the appropriate position L2, the pump drive control part 12 drives the lift pump 8, and when the output voltage $V_{OUT}$ is 0 or larger, that is, when the ink liquid level 20*a* reaches the appropriate position L2, the pump drive control part 12 stops the lift pump 8. Accordingly, when the ink-jet head 1 consumes the ink 20 to thereby lower the ink liquid level 20*a*, replenishment of the ink 20 is automatically performed, thereby constantly maintaining the ink liquid level 20*a* at the appropriate position L2.

The main tank 9 is a container for storing the ink 20 used for replenishing the ink 20, which is discharged from the ink-jet head 1 to be consumed, to the sub-tank 3, at a position apart from the carriage 10.

The ink 20 contained in the main tank 9 is pumped up by the lift pump 8 and is supplied to the sub-tank 3 through the ink tube 7.

Next, operations of the ink-jet printer 100 will be described mainly about a remaining amount detection operation of the remaining amount detection sensor 4.

Figure 6:
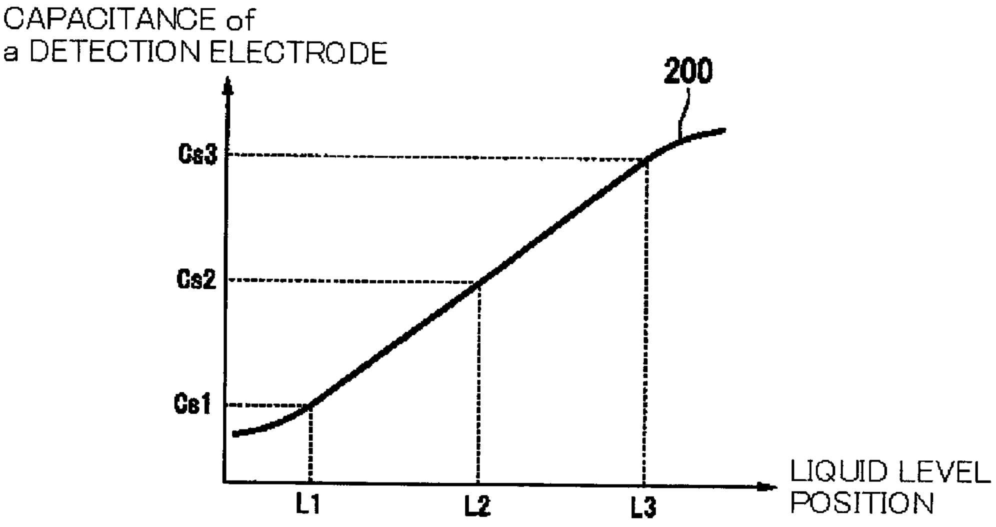
FIG. 6 is a graph schematically showing a relation between a liquid level position in a container and a capacitance of a detection electrode of the remaining amount detection sensor according to the first embodiment of the present invention.
Figure 7A:
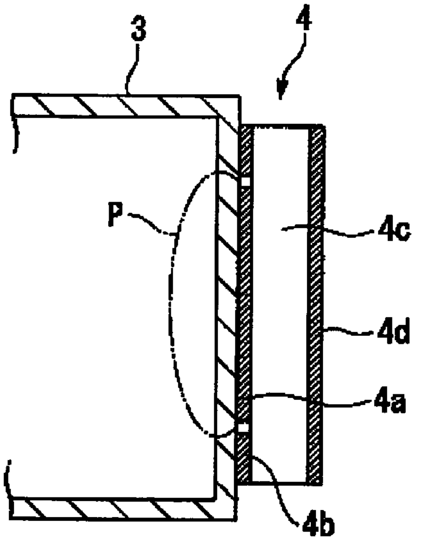
FIG. 7A is a conceptual diagram for explaining a range, of a capacitance to be detected by the remaining amount detection sensor according to the embodiment of the present invention.
Figure 7B:
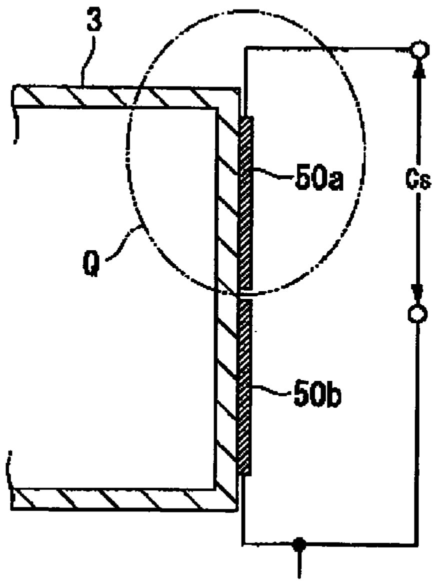
FIG.7B PRIOR ART
FIG. 7B is a conceptual diagram for explaining a range of a capacitance to be detected by a remaining amount detection sensor according to a related art.

FIG. 6 is a graph schematically showing a relation between the liquid level position in the container and the capacitance of the detection electrode of the remaining amount detection sensor according to the first embodiment of the present invention. An axis of abscissa represents the liquid level position and an axis of ordinate represents the capacitance to be detected. FIG. 7A is a conceptual diagram for explaining a range of the capacitance to be detected by the remaining amount detection sensor according to the embodiment of the present invention. FIG. 7B is a conceptual diagram for explaining a range of the capacitance to be detected by a remaining amount detection sensor according to a related art.

In the remaining amount detection sensor 4, the guard electrode 4*b*, which is grounded, is disposed around the detection electrode 4*a*, and the guard electrode 4*d*, which is grounded, is disposed in a range covering the guard electrode 4*b* so as to face each of the detection electrode 4*a* and the guard electrode 4*b*.

Accordingly, the capacitance of the detection electrode 4*a* on a side of the guard electrode 4*d* is constant, and an electric field outside the guard electrode 4*d* is shielded.

As a result, the capacitance of the detection electrode 4*a* is not affected even when, for example, a positional relation with respect to components provided outside the guard electrode 4*d* is changed by the movement of the carriage 10, other movable members, and the like. Further, even when an electrical circuit is provided near an external surface side of the guard electrode 4*d*, an effect of the electric field generated by the electrical circuit is blocked or reduced.

On the other hand, in a space formed on the sub-tank 3 side, the detection electrode 4*a* is adjacent to the guard electrode 4*b* through the sub-tank 3 and the ink 20 contained in the sub-tank 3.

For this reason, in the remaining amount detection sensor 4, the capacitance of the detection electrode 4*a* is affected only by a change of a dielectric body provided in the space formed on the sub-tank 3 side near the surface of the detection electrode 4*a*, as shown in a region P indicated by the alternate long and two short dashes line of FIG. 7A.

Accordingly, effects of various noises can be reduced, thereby making it possible to measure the capacitance near the detection electrode 4*a* with high accuracy.

For example, as in a comparative example of the related art shown in FIG. 7B, when a reference electrode 50*b* and a detection electrode 50*a*, which are grounded, are disposed in the height direction on the side surface of the sub-tank 3 to measure the capacitance $C_S$ of the detection electrode 50*a*, the capacitance of the detection electrode 50*a* is affected by peripheral dielectric bodies provided therearound in almost all the directions. Accordingly, as shown within a range of a region Q, the capacitance of the detection electrode 50*a* is affected also by the dielectric body provided outside the sub-tank 3 to the same degree as the sub-tank 3 and the dielectric body inside the sub-tank 3.

As a result, unlike the case of the first embodiment of the present invention, for example, when the positional relation with respect to the components provided outside the detection electrode 50*a* is changed by the movement of the carriage 10, other movable members, and the like, the capacitance of the detection electrode 50*a* is to be changed. In addition, the detection electrode 50*a* is affected also by the electric field of the electrical circuit disposed near the detection electrode 50*a* because the electric field outside the detection electrode 50*a* is not shielded.

As shown in FIG. 4, in the sub-tank 3, when the liquid level is changed from a height L1 to a height L3 (L3>L1) substantially corresponding to a height range of the long side of the detection electrode 4*a*, the capacitance is increased according to the rise of the ink liquid level 20*a*. For example, as represented by a curve 200 shown in FIG. 6, while the ink liquid level 20*a* is changed from L1 to L2 to L3, the capacitance is substantially linearly and monotonously increased from $C_S$1 to $C_S$2 to and $C_S$3.

As a specific numerical example, the range of the capacitance to be detected by the remaining amount detection sensor 4 is, for example, a range from $C_S1$=28 pF to $C_S3$=55 pF in the following case. That is, for example, in a case where there is used the remaining amount detection sensor 4 which includes the dielectric layer 4*c* made of resin-impregnated glass fiber of d=1 mm, has the detection electrode 4*a* and the guard electrodes 4*b* and 4*d* each formed of copper foil having a thickness of 35 μm, has an outer shape of $W_1 \times H_1$=50 mm×50 mm, and has the detection electrode 4*a* formed with a size of $W_2 \times H_2$=16 mm×38 mm at a central position thereof (that is, a=16 mm and b=5 mm in FIG. 3), and in a case where the sub-tank 3 is made of polyethylene having a wall thickness of 1 mm and contains aqueous ink.

The remaining amount detection sensor 4 according to the first embodiment of the present invention can detect, as the output voltage $V_{OUT}$ of the remaining amount detection circuit part 11, the change in capacitance of the detection electrode 4*a*, which corresponds to the height of the ink liquid level 20*a*. In addition, the remaining amount detection sensor 4 can perform control such that the pump drive control part 12 drives the lift pump 8 so that the output voltage $V_{OUT}$ becomes constant, and so that the height of the ink liquid level 20*a* in the sub-tank 3 is set to the appropriate position L2.

In this case, the amount of the ink 20 to be discharged from the ink-jet head 1 is extremely small, and the change in capacitance due to fluctuation of the ink liquid level 20*b* is also extremely small. However, in the first embodiment of the present invention, measurement noise can be reduced, with the result that a liquid level control can be performed with accuracy.

Accordingly, even when the ink 20 is consumed by the ink-jet head 1, the height of the ink liquid level 20*a* in the sub-tank 3 can be stably maintained at the appropriate position L2. As a result, a stable meniscus can be formed at the ink nozzles of the excellent ink-jet head 1 and excellent image recording can be performed.

Second Embodiment

A description is given of a remaining amount detection sensor according to a second embodiment of the present invention.

Figure 8:
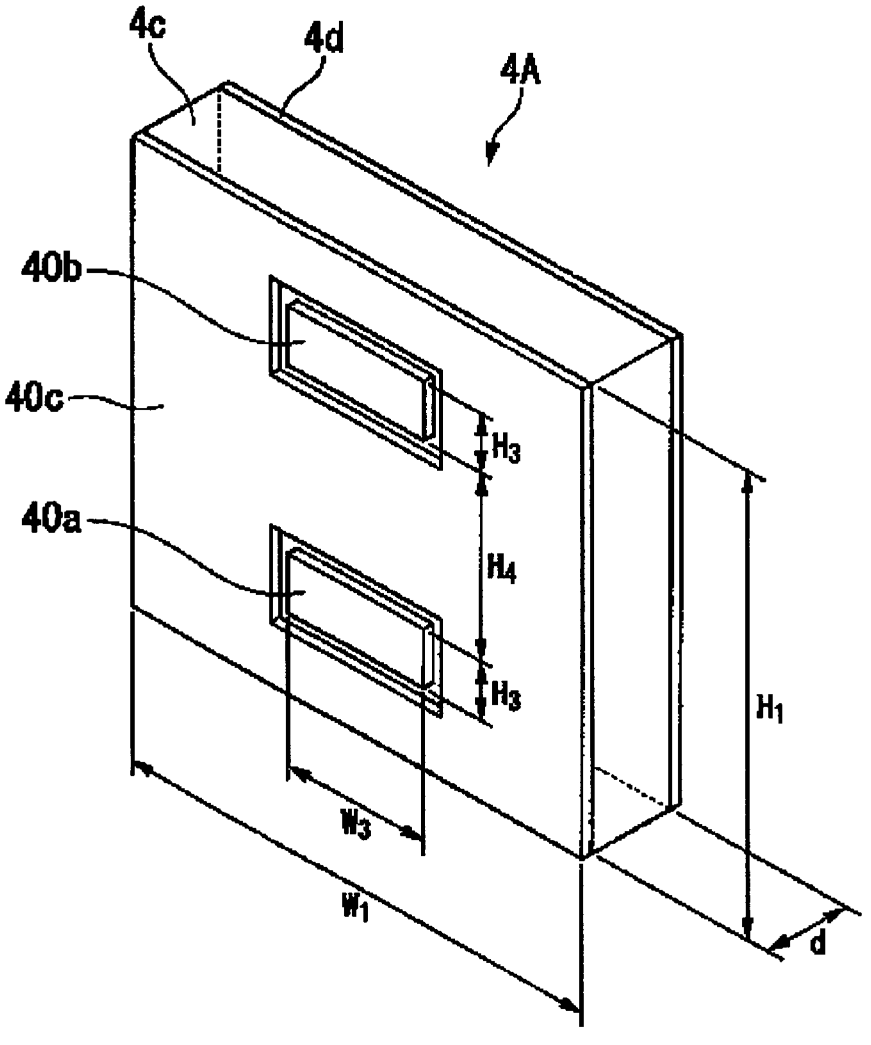
FIG. 8 is a perspective view showing a structure of a remaining amount detection sensor according to a second embodiment of the present invention.
Figure 9:
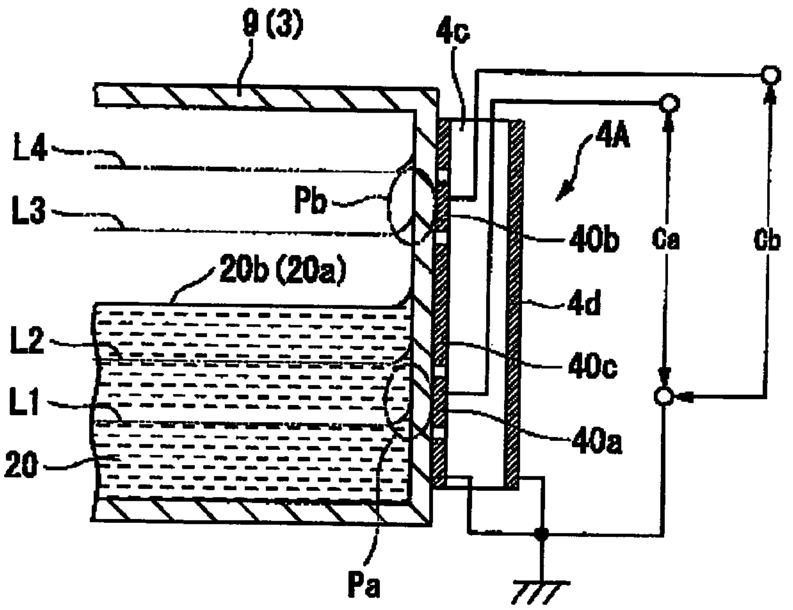
FIG. 9 is a cross-sectional diagram of a side view of an arrangement state of the remaining amount detection sensor according to the second embodiment of the present invention.
Figure 10A:
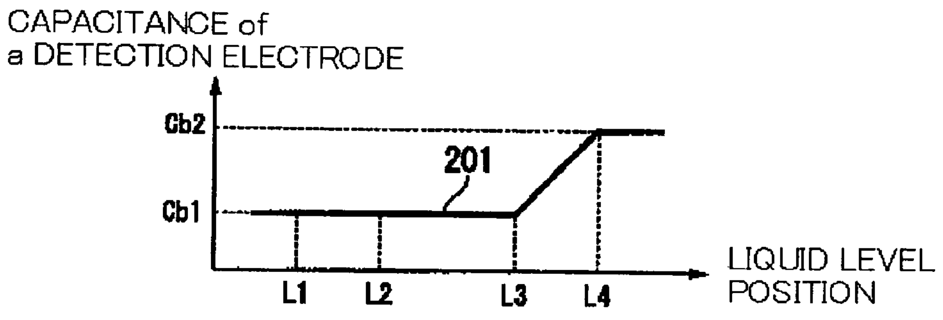
FIGS. 10A and 10B are graphs each schematically showing a relation between a liquid level position in a container and a capacitance of a detection electrode of the remaining amount detection sensor according to the second embodiment of the present invention.
Figure 10B:
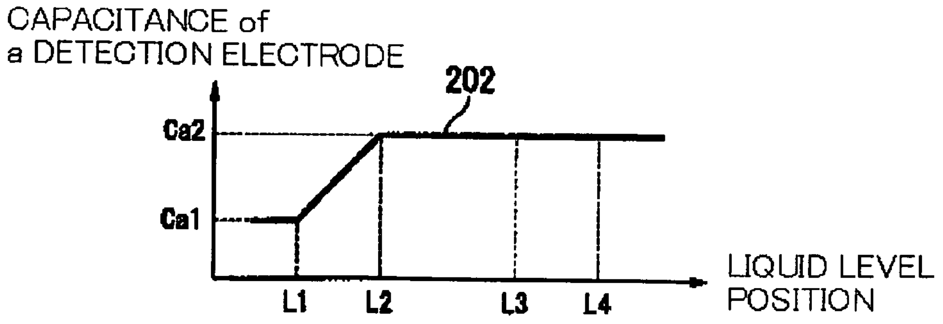

FIG. 8 is a perspective view showing a structure of the remaining amount detection sensor according to the second embodiment of the present invention. FIG. 9 is a cross-sectional diagram of a side view of an arrangement state of the remaining amount detection sensor according to the second embodiment of the present invention. FIGS. 10A and 10B are graphs each schematically showing a relation between a liquid level position in a container and a capacitance of a detection electrode of the remaining amount detection sensor according to the second embodiment of the present invention. An axis of abscissa represents the liquid level position and an axis of ordinate represents the capacitance to be detected.

As shown in FIGS. 8 and 9, a remaining amount detection sensor 4A according to the second embodiment of the present invention includes detection electrodes 40*a* and 40*b* in place of the detection electrode 4*a* of the remaining amount detection sensor 4 of the first embodiment, and a guard electrode 40*c* (second guard electrode) in place of the guard electrode 4*b*.

As shown in FIG. 1, for example, the remaining amount detection sensor 4A is disposed outside the side surface of the main tank 9 in the ink-jet printer 100 of the first embodiment, and measures the capacitance on the main tank 9 side to detect whether a height of an ink liquid level 20*b* is within a predetermined range, thereby detecting the remaining amount of the ink 20 contained in the main tank 9.

Hereinafter, the differences from the first embodiment will be mainly described.

The detection electrodes 40*a* and 40*b* are rectangular conductive layers, each of which has a long side $W_3$ and a short side $H_3$, and which are arranged in parallel with each other with a distance $H_4$ (note that $2 \cdot H_3 + H_4 < H_1$ and $W_3 < W_1$) and are provided on a surface to be brought into close contact with the remaining amount detection sensor 4A, thereby enabling detection of a potential via wiring (not shown). The short side of each of the detection electrodes 40*a* and 40*b* is placed along a height direction of an object whose remaining amount is to be detected of, for example, the main tank 9, that is, a vertical direction in which the ink liquid level 20*b* rises or falls (see FIG. 9).

The guard electrode 40*c* is a conductive layer which is disposed in the same plane as the detection electrodes 40*a* and 40*b* so as to surround an outer periphery of each of the detection electrodes 40*a* and 40*b*, is extended to an outer edge of the remaining amount detection sensor 4A, that is, a rectangular outer shape with a size of $W_1 \times H_1$, and is grounded via wiring (not shown).

Accordingly, as shown in FIG. 9, between the detection electrodes 40*a* and 40*b* and the guard electrodes 40*c* and 4*d*, there are formed capacitors having combined capacitances $C_a$ and $C_b$, respectively.

The capacitances $C_a$ and $C_b$ can be measured using an electrical circuit similar to the remaining amount detection circuit part 11 of the first embodiment.

The remaining amount detection sensor 4A with the above-mentioned structure has the same structure as that in which the remaining amount detection sensors 4 of the first embodiment are arranged in parallel with each other in a vertical direction to be integrated with each other.

Accordingly, in the same manner as in the detection electrode 4*a* of the first embodiment, the capacitance of the detection electrode 40*a* (40*b*) is affected only by the change of the dielectric body provided in the space formed on the sub-tank 3 side near the surface of the detection electrode 40*a* (40*b*) as shown in a region $P_a$ ($P_b$) indicated by the alternate long and two short dashes line of FIG. 9.

Accordingly, when it is assumed that a height of the ink liquid level 20*b* near a lower end position of the detection electrode 40*a* and a height thereof near an upper end position of the detection electrode 40*a* are set as L1 and L2, respectively, and when it is assumed that a height of the ink liquid level 20*b* near a lower end position of the detection electrode 40*b* and a height thereof near an upper end position of the detection electrode 40*b* are set as L3 and L4, respectively, the capacitance of each of the detection electrodes 40*a* and 40*b* is changed as indicated by a curve 201 of FIG. 10A and a curve 202 of FIG. 10B.

Specifically, when the ink liquid level 20*b* is lower than the height L3, the capacitance of the detection electrode 40*b* is measured as a relatively small value $C_b$1 because the ink 20 does not enter the region $P_b$. When the ink liquid level 20*b* is positioned between the heights L3 and L4, the capacitance is substantially linearly increased from $C_b$1 to $C_b$2 according to the height of the ink liquid level 20*b*. When the ink liquid level 20*b* is equal to or higher than the height L4, the ink 20 is filled in the entire detection range of the detection electrode 40*b*, with the result that a constant value $C_b$2 is measured.

In a similar manner, when the height of the ink liquid level 20*b* is positioned between the heights L1 and L2, the capacitance of the detection electrode 40*a* is substantially linearly increased from $C_a$1 to $C_a$2, and when the height is equal to or higher than the height L2, a constant value $C_a$2 is measured.

Thus, according to the remaining amount detection sensor 4A, a magnitude of the capacitance of each of the detection electrodes 40*b* and 40*a* is analyzed, thereby making it possible to detect the positional relation of the ink liquid level 20*b* with respect to the four heights L1, L2, L3, and L4 corresponding to the arrangement positions of the detection electrodes 40*b* and 40*a* in the height direction. For example, when the capacitances of the detection electrodes 40*b* and 40*a* are $C_b$1 and $C_a$2, respectively, it can be detected that the ink liquid level 20*b* is positioned between the heights L2 and L3.

In particular, in a height range from L1 to L2, and in a height range from L3 to L4, by the use of the capacitance of each of the detection electrodes 40*b* and 40*a*, the height of the ink liquid level 20*b* can be measured.

In this case, in the same manner as in the first embodiment, the effects of various noises are reduced, thereby making it possible to measure the capacitances near the detection electrode 40*a* and 40*b* with high accuracy.

The remaining amount detection sensor 4A singly includes a plurality of detection electrodes. Accordingly, for example, the remaining amount detection sensor 4A can detect the ink liquid level 20*b* in the main tank 9, to thereby singly detect whether the remaining amount of the ink 20 contained in the main tank 9 is within the range of the predetermined amount with reliability. When the liquid level of the ink liquid level 20*b* is lower than the height L2, a reduction amount can be detected with accuracy. As a result, by the use of a detection output, an ink remaining amount can be displayed, and alarm display for urging a user to replenish ink can be performed.

Further, when the ink 20 is replenished to the main tank 9, through detection of the height of the ink liquid level 20*b*, a warning of proximity of a limit of a replenishment amount can be issued.

Third Embodiment

A description is given of a remaining amount detection sensor according to a third embodiment of the present invention.

Figure 11:
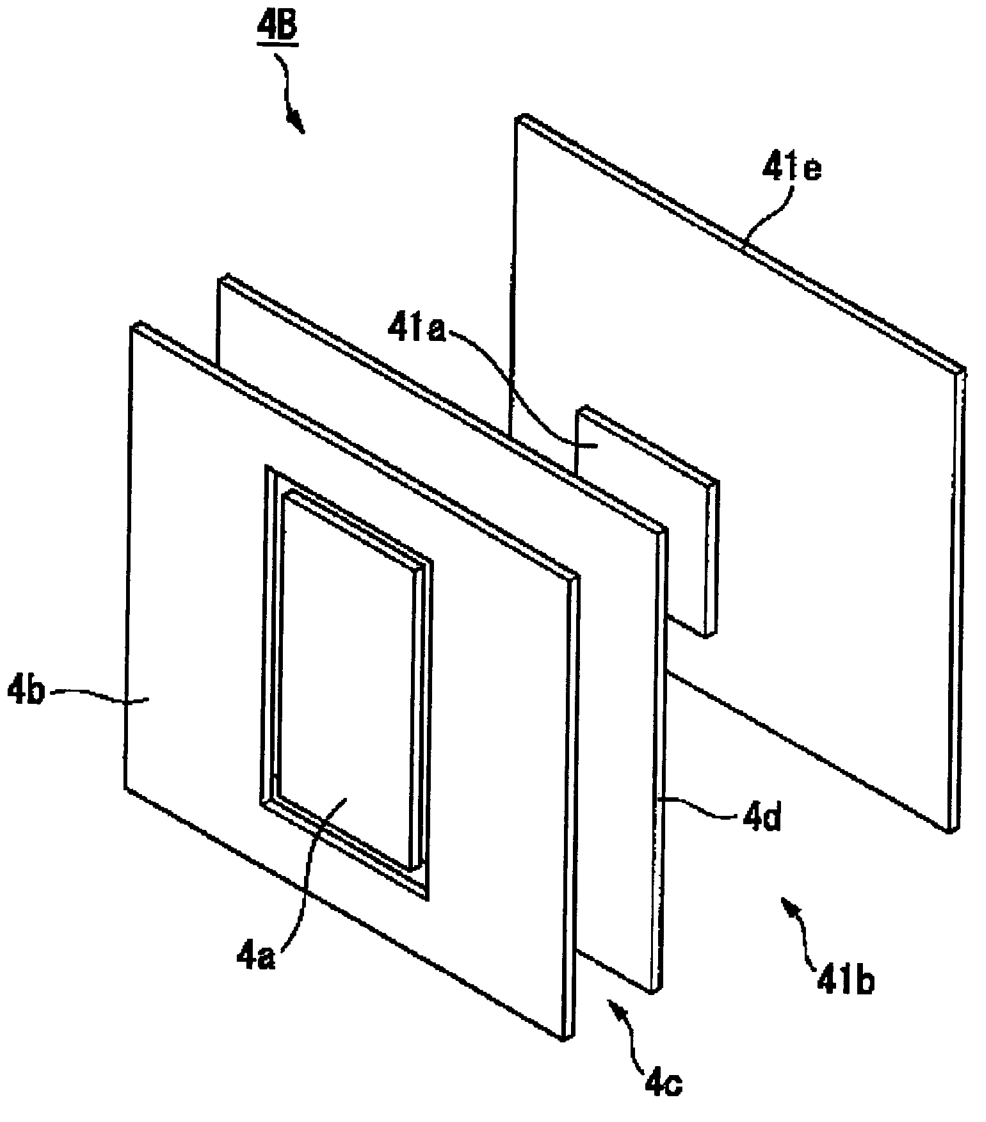
FIG. 11 is an exploded perspective view showing arrangement of electrodes of a remaining amount detection sensor according to a third embodiment of the present invention.
Figure 12:
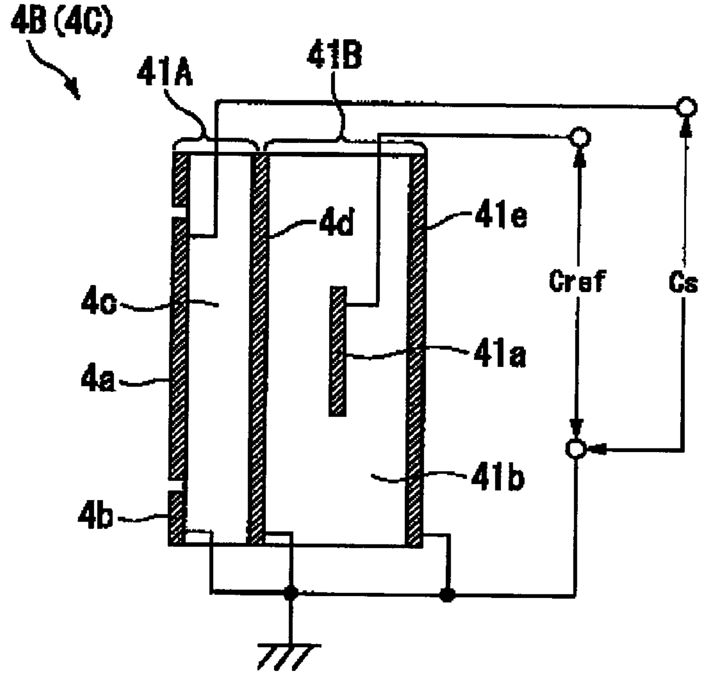
FIG. 12 is across-sectional diagram of a side view of a structure of the remaining amount detection sensor according to the third embodiment of the present invention.

FIG. 11 is an exploded perspective view showing arrangement of electrodes of the remaining amount detection sensor according to the third embodiment of the present invention. FIG. 12 is a cross-sectional diagram of a side view of a structure of the remaining amount detection sensor according to the third embodiment of the present invention.

As shown in FIGS. 11 and 12, a remaining amount detection sensor 4B according to the third embodiment of the present invention includes a guard electrode 41*e* (third guard electrode), a reference electrode 41*a*, and a dielectric layer 41*b*, in addition to a detection part 41A which is structured in the same manner as the remaining amount detection sensor 4 of the first embodiment.

The guard electrode 41*e* is a conductive layer having the same shape and made of the same material as the guard electrode 4*d*, is disposed so as to face the guard electrode 4*d* on an opposite side of the detection electrode 4*a*, and is grounded via wiring (not shown).

Between the guard electrode 4*d* and the guard electrode 41*e*, the dielectric layer 41*b* made of the same material as that of the dielectric layer 4*c* is disposed.

The reference electrode 41*a* is formed of a conductive layer having an area smaller than that of each of the guard electrodes 4*d* and 41*e*, and is disposed in the dielectric layer 41*b* at an intermediate position in a direction in which the guard electrodes 4*d* and 41*e* are spaced apart, and at a substantial center between surface directions of the guard electrodes 4*d* and 41*e*, thereby making it possible to detect the potential via wiring (not shown).

The area of the reference electrode 41*a*, the distance between the guard electrodes 4*d* and 41*e*, and the like are set so that the capacitance of the reference electrode 41*a* is set to the constant value $C_{ref}$.

Thus, in the remaining amount detection sensor 4B, the detection part 41A serving as a capacitor showing the capacitance $C_S$ corresponding to the peripheral dielectric body, and the reference part 41B serving as a capacitor having the constant capacitance $C_{ref}$ are integrated in layers.

Accordingly, the remaining amount detection sensor 4B according to the third embodiment of the present invention can be formed of a multilayer printed board with the detection electrode 4*a*, the guard electrode 4*b*, and the guard electrodes 4*d* and 41*e* each being used as the electrode pattern. In this case, the dielectric layer 41*b* is formed of a base material of the multilayer printed board.

In the remaining amount detection sensor 4B with the above-mentioned structure, the reference part 41B is integrated with the detection part 41A and serves as a capacitor made of the same material as that of the detection part 41A. Accordingly, the capacitance $C_{ref}$ can be formed in the same order as that of the capacitance $C_S$ of the detection part 41A merely by changing the area of the reference electrode 41*a*, the thickness of the dielectric layer 41*b*, and the like to a small extent in an analog manner.

For this reason, for example, it is extremely easy to obtain, through an experiment or the like, a capacitance in a case where the detection electrode 4*a* is disposed at a detection position of the sub-tank 3 and the ink liquid level 20*a* is positioned at the appropriate height, and to set the capacitance $C_{ref}$ to a value which exactly matches the measured value.

The reference part 41B thus set can be used in place of the reference capacitor 31 of the remaining amount detection circuit part 11 of the first embodiment.

In this case, because the reference part 41B is integrated with the detection part 41A and is made of the same material as that of the detection part 41A, the reference part 41B is to be changed in the same manner as the detection part 41A when the capacitance is changed due to a change in environmental conditions, for example, a change in temperature and humidity. As a result, even when the environmental conditions are changed, the difference ΔC in capacitance between the detection part 41A and the reference part 41B is obtained in a state where effects of the environmental conditions are cancelled, and the difference ΔC can be measured with high accuracy.

On the other hand, as in the first embodiment, in the case of using the reference capacitor 31 disposed at a position apart from the remaining amount detection sensor 4 and having a structure different from that of the remaining amount detection sensor 4, if the value of $C_{ref}$ can be set so as to be exactly matched with the value of $C_S$ in the appropriate condition, when the environmental conditions are changed, the remaining amount detection sensor 4 and the reference capacitor 31, which are made of different materials and have different structures, are individually changed in capacitance. As a result, a detection error of ΔC becomes larger than that in the case of using the remaining amount detection sensor 4B according to the third embodiment of the present invention.

Next, modified examples of the embodiments will be described.

Figure 13:
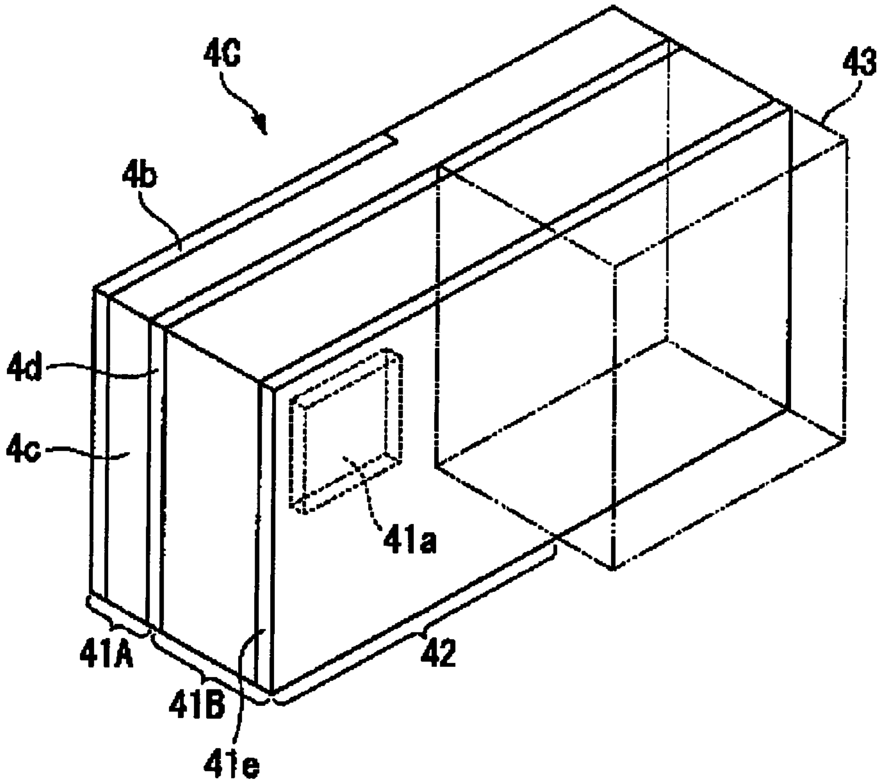
FIG. 13 is a perspective view schematically showing a general structure of a remaining amount detection sensor according to a modified example of the third embodiment of the present invention.

FIG. 13 is a perspective view schematically showing a general structure of a remaining amount detection sensor according to a modified example of the third embodiment of the present invention.

In a remaining amount detection sensor 4C according to the modified example of the present invention, a sensor part 42 having the same structure as that of the remaining amount detection sensor 4B according to the third embodiment is formed on a part of the multilayer printed board, and a remaining amount detection circuit part 43 (remaining amount detection circuit) is formed on the board on a side adjacent to the sensor part 42.

The remaining amount detection circuit part 43 can employ a structure using the reference part 41B as the reference capacitor 31 in the remaining amount detection circuit part 11 according to the first embodiment.

In the remaining amount detection sensor 4C according to the modified example, the remaining amount detection circuit part 43 is adjacent to and integrated with the sensor part 42. As a result, the wiring from each of the detection electrode 4*a* and the reference electrode 41*a* to the remaining amount detection circuit part 43 can be shortened and can be easily shielded by the use of the wiring pattern of the multilayer board, and signal degradation and noise contamination via the wiring can be reduced.

Accordingly, in combination with the operational effects described in the first and third embodiments, a highly accurate and compact remaining amount detection sensor can be obtained.

In this case, the remaining amount detection circuit part 43 may be disposed at any position as long as the position does not affect the capacitance of the detection electrode 4*a* and the capacitance of the reference electrode 41*a*. In the modified example, the remaining amount detection circuit part 43 is formed on a substrate layer on an opposite side of the detection electrode 4*a* with respect to the guard electrode 4*d* on the lateral side of the sensor part 42.

In this case, the effect of the electric field of the remaining amount detection circuit part 43 with respect to the detection electrode 4*a* can be blocked by the guard electrode 4*d*.

The remaining amount detection sensor 4C according to the third embodiment is an example of a remaining amount detection sensor with a four-layered structure in which the guard electrode 4*d* is disposed on a rear side (opposite side of container) of the detection electrode 4*a* and the guard electrode 4*b*, and the reference electrode 41*a* and the guard electrode 41*e* are also disposed on the rear side thereof.

In other words, the remaining amount detection sensor 4C is an example of a remaining amount detection sensor including the third, guard electrode which is set to the same potential as that of each of the first and second guard electrodes and which is disposed so as to face the second guard electrode with a space on the opposite side of the container, and the reference electrode which is disposed so as to be sandwiched in the range in which the second guard electrode and the third electrode are opposed to each other. The reference electrode is integrally formed on the rear side of the detection part which is formed of the detection electrode and the first and second guard electrodes, whereby the reference electrode is integrated with the detection electrode so as to be set in substantially the same environmental conditions.

Note that, in the case of the multilayer printed board, the dielectric layer 41*b* is generally joined through a thin joining layer along the reference electrode 41*a*. In the schematic diagram of FIG. 12, the joining layer is omitted (similarly in cross-sectional diagram mentioned below).

Fourth Embodiment

A description is given of a remaining amount detection sensor according to a fourth embodiment of the present invention.

Figure 14:
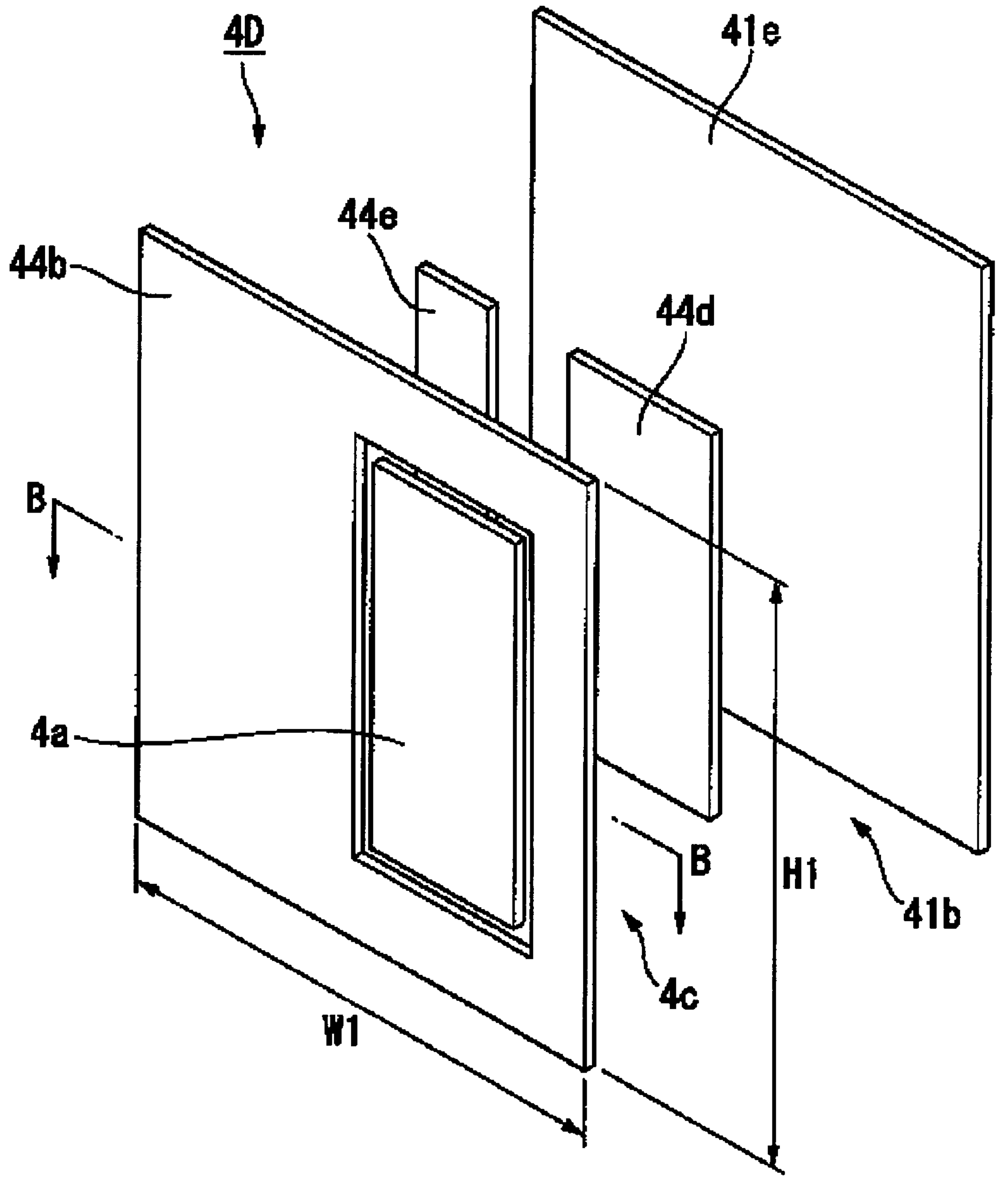
FIG. 14 is an exploded perspective view showing arrangement of electrodes of a remaining amount detection sensor according to a fourth embodiment of the present invention.
Figure 15:
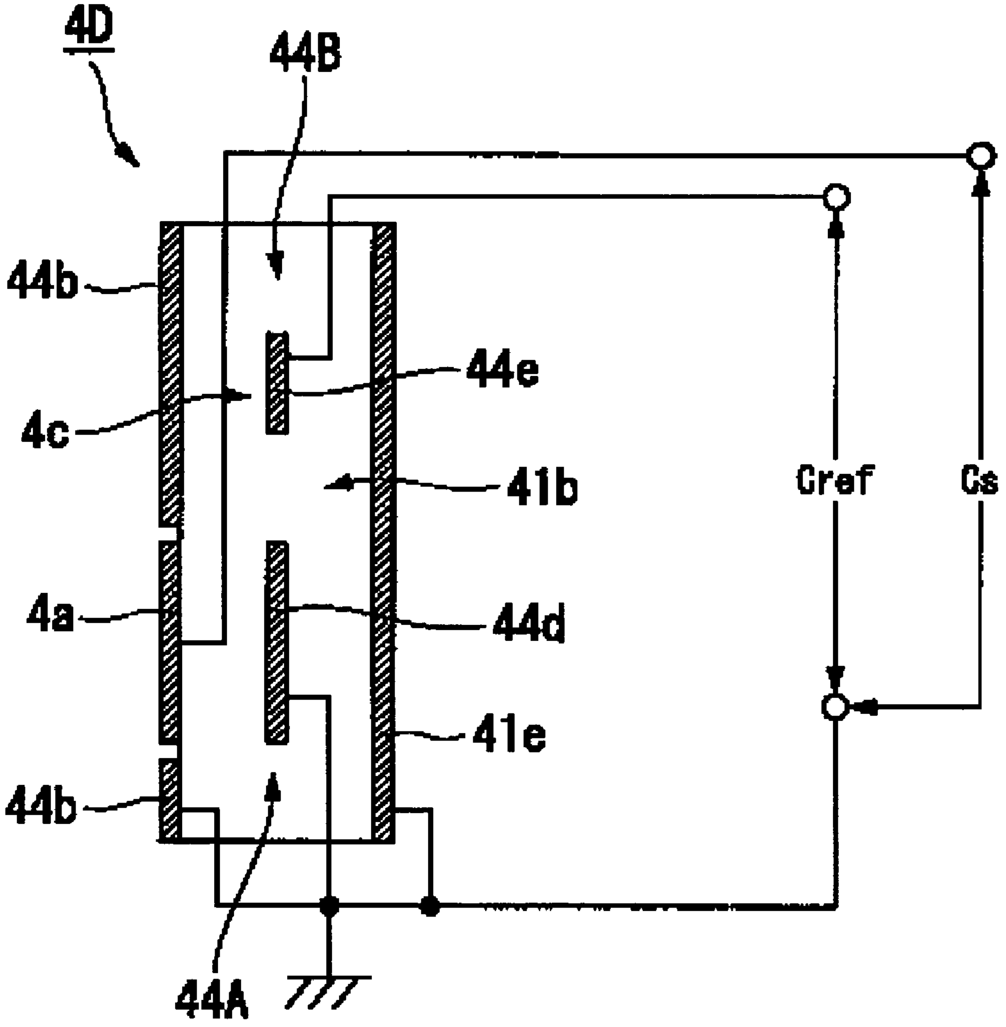
FIG. 15 is a cross-sectional diagram of the remaining amount detection sensor according to the fourth embodiment of the present invention taken along the line B-B of FIG. 14.

FIG. 14 is an exploded perspective view showing arrangement of electrodes of the remaining amount detection sensor according to the fourth embodiment of the present invention. FIG. 15 is a cross-sectional diagram of the remaining amount detection sensor according to the fourth embodiment of the present invention taken along the line B-B of FIG. 14.

As shown in FIGS. 14 and 15, a remaining amount detection sensor 4D according to the fourth embodiment of the present invention includes a guard electrode 44*b* (first guard electrode), a guard electrode 44*d* (second guard electrode), and a reference electrode 44*e* in place of the guard electrodes 4*b* and 4*d* and the reference electrode 41*a* of the remaining amount detection sensor 4C of the third embodiment. Hereinafter, the differences from the above embodiments will be mainly described.

The guard electrode 44*b* is obtained by shifting an opening of the guard electrode 4*b* of the third embodiment in a short side direction of the detection electrode 4*a*, and has an outer shape with the same size as that of the guard electrode 4*b*. The guard electrode 44*b* is formed so as to surround the outer periphery of the detection electrode 4*a* in the same plane as the detection electrode 4*a*.

On the rear side of the detection electrode 4*a* and on the rear side (opposite side of container) of the guard electrode 44*b*, the guard electrode 44*d* and the reference electrode 44*e* are disposed, respectively, through the dielectric layer 4*c*.

In this case, the detection electrode 4*a* is disposed at a position apart from the center of the guard electrode 44*b*, and the guard electrode 44*d* is disposed on the rear side of the detection electrode 4*a* and disposed at least in a range covering the detection electrode 4*a*.

Further, the reference electrode 44*e* is formed in a rectangle shape extending in the same direction as the guard electrode 4*b*, and is formed with a size capable of being covered with the guard electrode 44*b*. In addition, the reference electrode 44*e* is disposed on a lateral side of the guard electrode 44*d* in parallel with each other.

In at least the range covering the reference electrode 44*e* on the rear side of the reference electrode 44*e*, the guard electrode 41*e* is disposed so as to face the reference electrode 44*e* in parallel with each other through the dielectric layer 41*b*. Thus, in the fourth embodiment of the present invention, the guard electrode 41*e* also covers the entirety of the guard electrode 44*d*.

Accordingly, the outer shape of the remaining amount detection sensor 4D is a rectangle shape with a size of $W_1 \times H_1$ which can be contained within the range of the side surface of the sub-tank 3.

The remaining amount detection sensor 4D according to the fourth embodiment of the present invention is formed using a three-layered multilayer printed board. In other words, the detection electrode 4*a* and the guard electrode 44*b* are formed by a first layer conductive pattern, the guard electrode 44*d* and the reference electrode 44*e* are formed by a second layer conductive pattern, and the guard electrode 41*e* is formed by a third layer conductive pattern (solid pattern).

Further, the dielectric layer 4*c* is formed of an insulating layer between the first layer conductive pattern and the second layer conductive pattern. The dielectric layer 41*b* is formed of an insulating layer between the second layer conductive pattern and the third layer conductive pattern.

Note that the structure of the remaining amount detection sensor 4D is not limited to the structure of a single multilayer printed board. For example, the remaining amount detection sensor 4D may be structured by bonding a single-sided printed board and a double-sided printed board together with an adhesive to form a lamination structure having three conductive pattern layers.

The guard electrodes 44*b*, 44*d*, and 41*e* are each grounded via wiring (not shown), and are each set to the same potential. As shown in FIG. 15, between the detection electrode 4*a* and the guard electrode 44*b*, and between the detection electrode 4*a* and the guard electrode 44*d*, there are formed capacitors having the combined capacitance of $C_S$. In addition, between the reference electrode 44*e* and the guard electrode 44*b*, and between the reference electrode 44*e* and the guard electrode 41*e*, there are formed reference capacitors having the combined capacitance of $C_{ref}$.

Wiring connected to the detection electrode 4*a*, wiring connected to the reference electrode 44*e*, and a ground wire connected to each of the guard electrodes 44*b*, 44*d*, and 41*e* are each electrically connected to a remaining amount detection circuit (not shown) for detecting the capacitance of the detection electrode 4*a* to thereby detect the remaining amount in the sub-tank 3

Note that the area of the reference electrode 44*e*, the distance between the guard electrodes 44*d* and 41*e*, and the like are set so that the capacitance of the reference electrode 44*e* is set to the constant value $C_{ref}$.

As described above, in the remaining amount detection sensor 4D, the detection part 44A serving as a capacitor showing the capacitance $C_S$ corresponding to the peripheral dielectric body, and the reference part 44B serving as a capacitor having the constant capacitance $C_{ref}$ are formed in an integrated manner. In other words, the reference part 44B integrated with the detection part 44A serves as a capacitor made of the same material as that of the detection part 44A. For this reason, the capacitance $C_{ref}$ can be formed in the same order as that of the capacitance $C_S$ of the detection part 44A merely by changing the area of the reference electrode 44*e*, the thicknesses of the dielectric layers 4*c* and 41*b*, and the like to a small extent in an analog manner.

Accordingly, for example, it is extremely easy to obtain, through an experiment or the like, a capacitance in a case where the detection electrode 44*a* is formed at a detection position for the sub-tank 3 and the ink liquid level 20*a* is positioned at the appropriate height, and to set the capacitance $C_{ref}$ to a value which exactly matches the measured value.

The reference part 44B thus set can be used in place of the reference capacitor 31 of the remaining amount detection circuit part 11 according to the first embodiment, and the same effects as those of the third embodiment can be obtained.

Further, since the guard electrode 44*d* and the reference electrode 44*e* are formed in the same plane, in the case of forming the detection electrode 4*a*, the guard electrodes 44*b*, 44*d*, and 41*e*, and the reference electrode 44*e* by the conductive pattern of the multilayer printed board, the guard electrode 44*d* and the reference electrode 44*e* are formed by the conductive pattern in the same layer. As a result, the number of layers of the multilayer printed board can be reduced.

In order to reduce the effects of the environmental conditions on the remaining amount detection accuracy of the remaining amount detection sensor 4D, it is preferable that the detection part 44A and the reference part 44B be disposed under substantially the same environmental conditions.

In order to achieve this, the position of the reference electrode 44*e* in a width $W_1$ direction is preferably set to a position close to the detection electrode 4*a* to an extent that the reference electrode 44*e* is not affected by the capacitor formed of the detection electrode 4*a* and the guard electrode 44*d*. Further, a length of the reference electrode 44*e* in a long side direction is preferably set to a length equivalent to that of the guard electrode 44*b*.

The remaining amount detection sensor 4D according to the fourth embodiment is an example of a remaining amount detection sensor with a three-layered structure in which the guard electrode 44*d* is disposed on the rear side of the detection electrode 4*a*, and the reference electrode 44*e* is disposed so as to face the guard electrode 44*b* at a position in the same plane as the guard electrode 44*d* which is disposed on a side, thereof.

In other words, the remaining amount detection sensor 4D is an example of a remaining amount detection sensor including the third guard electrode which is set to the same potential as that of each of the first and second guard electrodes and which is disposed so as to face the first guard electrode with a space on the opposite side of the container, and the reference electrode which is disposed so as to be sandwiched in the range in which the first guard electrode and the third guard electrode are opposed to each other. The reference electrode is integrally formed on the lateral side of the detection part which is formed of the detection electrode and the first and second guard electrodes, whereby the reference electrode is integrated with the detection electrode so as to be set in substantially the same environmental conditions.

Fifth Embodiment

A description is given of a remaining amount detection sensor according to a fifth embodiment of the present invention.

Figure 16:
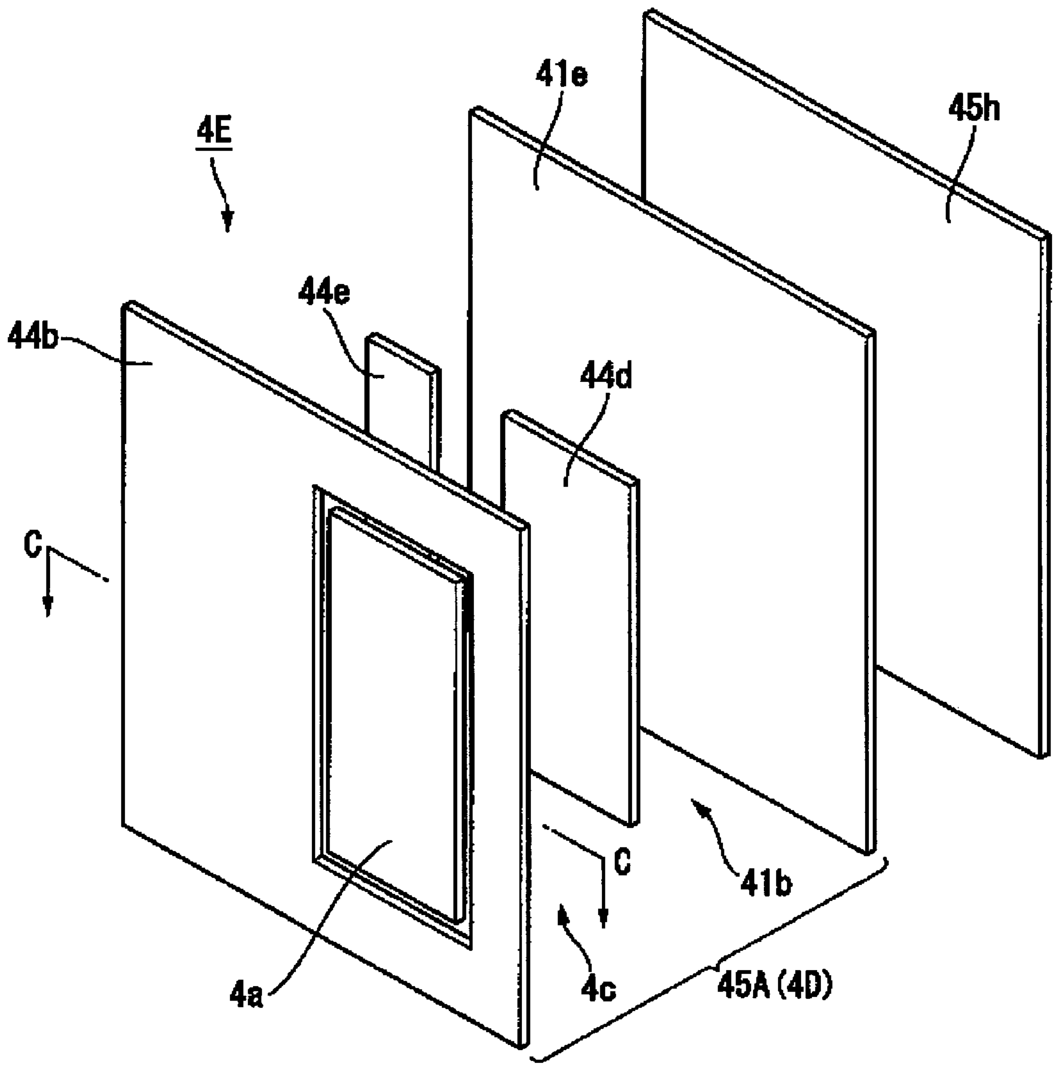
FIG. 16 is an exploded perspective view showing arrangement of electrodes of a remaining amount detection sensor according to a fifth embodiment of the present invention.
Figure 17:
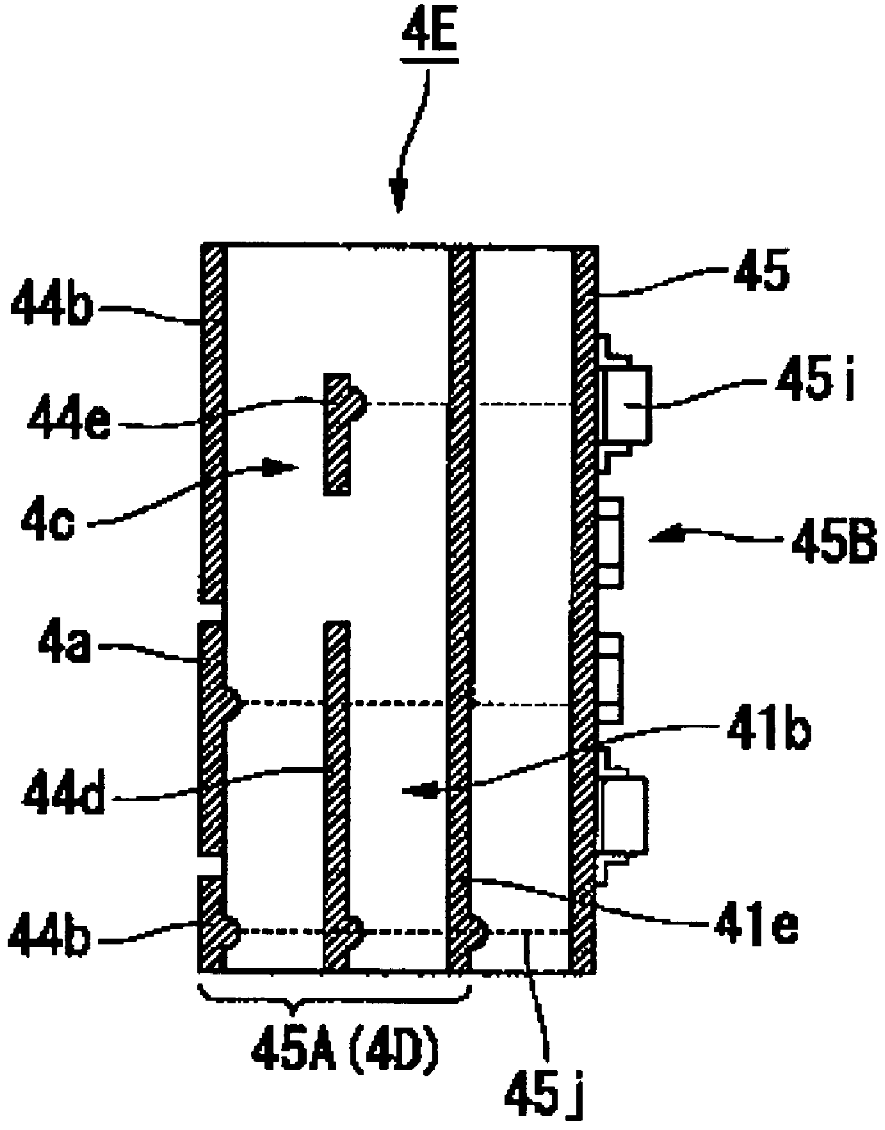
FIG. 17 is a cross-sectional diagram of the remaining amount detection sensor according to the fifth embodiment of the present invention taken along the line C-C of FIG. 16.

FIG. 16 is an exploded perspective view showing arrangement of electrodes of the remaining amount detection sensor according to the fifth embodiment of the present invention. FIG. 17 is a cross-sectional diagram of the remaining amount detection sensor according to the fifth embodiment of the present invention taken along the line C-C of FIG. 16.

As shown in FIGS. 16 and 17, a remaining amount detection sensor 4E according to the fifth embodiment of the present invention is a generally widely used four-layered printed board in which a sensor part 45A, which has the same structure as that of the fourth embodiment, and a remaining amount detection circuit part 45B are integrated with each other. In this case, the structure of the sensor part 45A is completely the same as that of the remaining amount detection sensor 4D according to the fourth embodiment, so a description thereof is omitted.

Specifically, as shown in FIG. 17, in the remaining amount detection sensor 4E according to the fifth embodiment of the present invention, the detection electrode 4*a* and the guard electrodes 44*b*, 44*d*, 44*e*, and 41*e* of the sensor part 45A are formed by first to third layer conductive patterns of the four-layered printed board, and a fourth layer conductive pattern 45*h* is used for printed wiring for forming the detection circuit part 45B. A circuit part 45*i* is mounted in the conductive pattern 45*h*, and a side of the sensor part 45A and a side of the detection circuit part 45B are connected to each other via a through hole 45*j* or the like, for example, whereby the sensor part 45A and the detection circuit part 45B are laminated to be integrated with each other in substantially the same area range. With this structure, it is unnecessary to form the remaining amount detection circuit part 43 by extending the printed board as shown in FIG. 13. As a result, a projected area of the printed board is reduced, and a compact structure can be obtained at low cost.

Sixth Embodiment

A description is given of a remaining amount detection sensor according to a sixth embodiment of the present invention.

Figure 18:
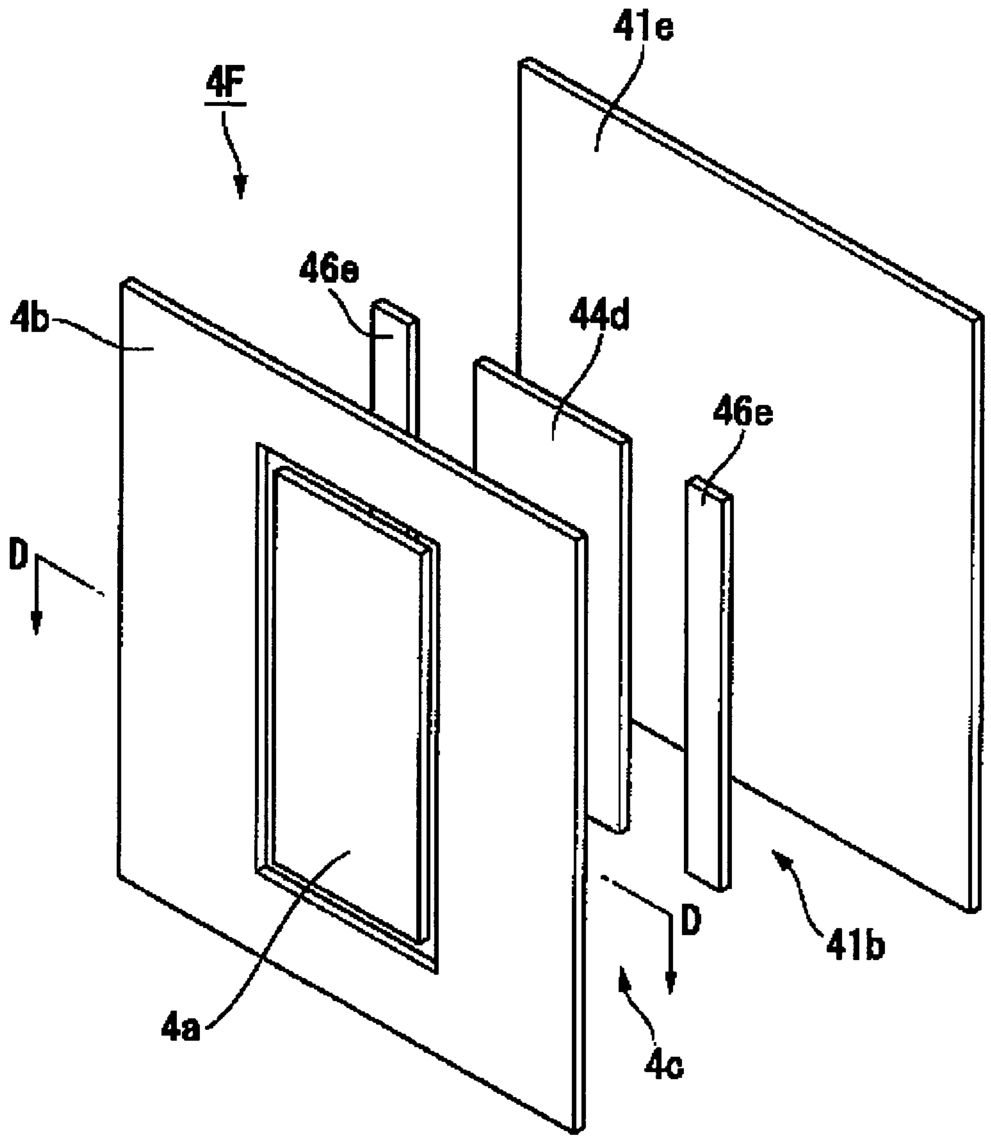
FIG. 18 is an exploded perspective view showing arrangement of electrodes of a remaining amount detection sensor according to a sixth embodiment of the present invention.
Figure 19:
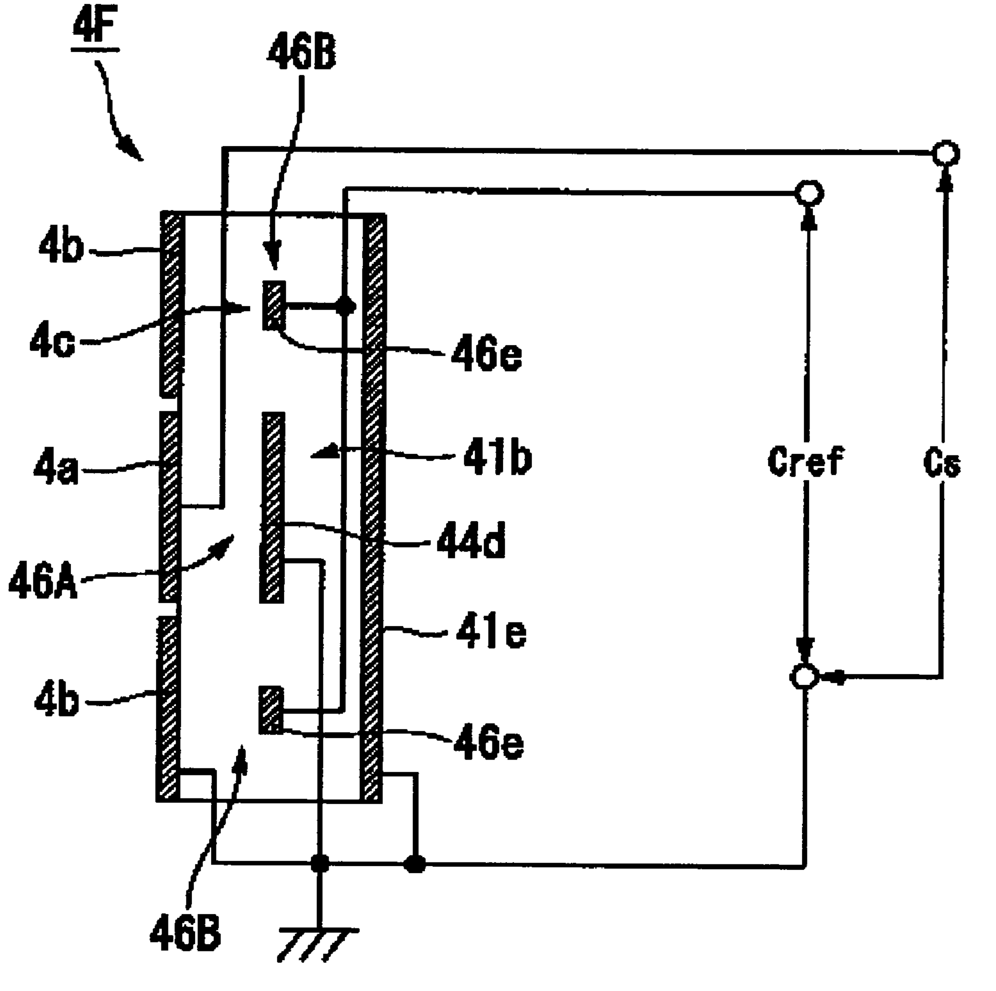
FIG. 19 is a cross-sectional diagram of the remaining amount detection sensor according to the sixth embodiment of the present invention taken along the line D-D of FIG. 18.

FIG. 18 is an exploded perspective view showing arrangement of electrodes of the remaining amount detection sensor according to the sixth embodiment of the present invention. FIG. 19 is a cross-sectional diagram of the remaining amount detection sensor according to the sixth embodiment of the present invention taken along the line-D-D of FIG. 18.

As shown in FIGS. 18 and 19, a remaining amount detection sensor 4F according to the sixth embodiment of the present invention includes, in the remaining amount detection sensor 4D according to the fourth embodiment, a guard electrode 4*b* (first guard electrode) in place of the guard electrode 44*b*, and a pair of reference electrodes 46*e* in place of the reference electrode 44*e*. Hereinafter, the differences from the above embodiments will be mainly described.

In the remaining amount detection sensor 4F, the detection electrode 4*a* is disposed at the center of the guard electrode 4*b* in the width direction as in the first embodiment. Further, on the rear side (opposite side of container) of the detection electrode 4*a*, the guard electrode 44*d* is disposed through the dielectric layer 4*c* as in the fourth embodiment.

The detection electrode 4*a* is disposed at the center of the guard electrode 4*b*, whereby the two reference electrodes 46*e* are disposed through the dielectric layer 4c in a range covered with the guard electrode 4b on the rear side of the guard electrode 4b in spaces formed on both lateral sides of the guard electrode 44d. In addition, on the rear side of each of the reference electrodes 46e and on the rear side of the guard electrode 44d, the guard electrode 41e is disposed through the dielectric layer 41b.

The reference electrodes 46e each have dimensions obtained by dividing into two the reference electrode 44e according to the fourth embodiment in the width direction, and are each set to the same potential via wiring (not shown).

The guard electrodes 4b, 44d, and 41e are each grounded via wiring (not shown), and are each set to the same potential. As shown in FIG. 19, between the detection electrode 4a and the guard electrode 4b, and between the detection electrode 4a and the guard electrode 44d, there are formed capacitors having the combined capacitance of $C_S$. In addition, between the reference electrode 46e and the guard electrode 4b, and between the reference electrode 46e and the guard electrode 41e, there are formed reference capacitors having the combined capacitance of $C_{ref}$.

In the remaining amount detection sensor 4F with the above-mentioned structure, a detection part 46A having the same capacitance as that of the detection part 44A according to the fourth embodiment is formed, and reference parts 46B each serving as a reference capacitor having the same capacitance as that of the reference part 44B according to the fourth embodiment are formed on both lateral sides of the detection part 46A.

Accordingly, the measurement as to the remaining amount detection can be performed in the same manner as in the fourth embodiment.

In this case, the reference parts 46B are formed on both lateral sides of the detection part 46A, so the environmental conditions on the both lateral sides of the detection electrode 4a in a traverse direction affect each of the reference parts 46B in almost the same manner. As a result, even when the environmental conditions are different on both lateral sides of the detection part 46A, the effects on the detection accuracy of the remaining amount detection can be reduced. Accordingly, the remaining amount detection can be performed with high accuracy.

Seventh Embodiment

A description is given of a remaining amount detection sensor according to a seventh embodiment of the present invention.

Figure 20:
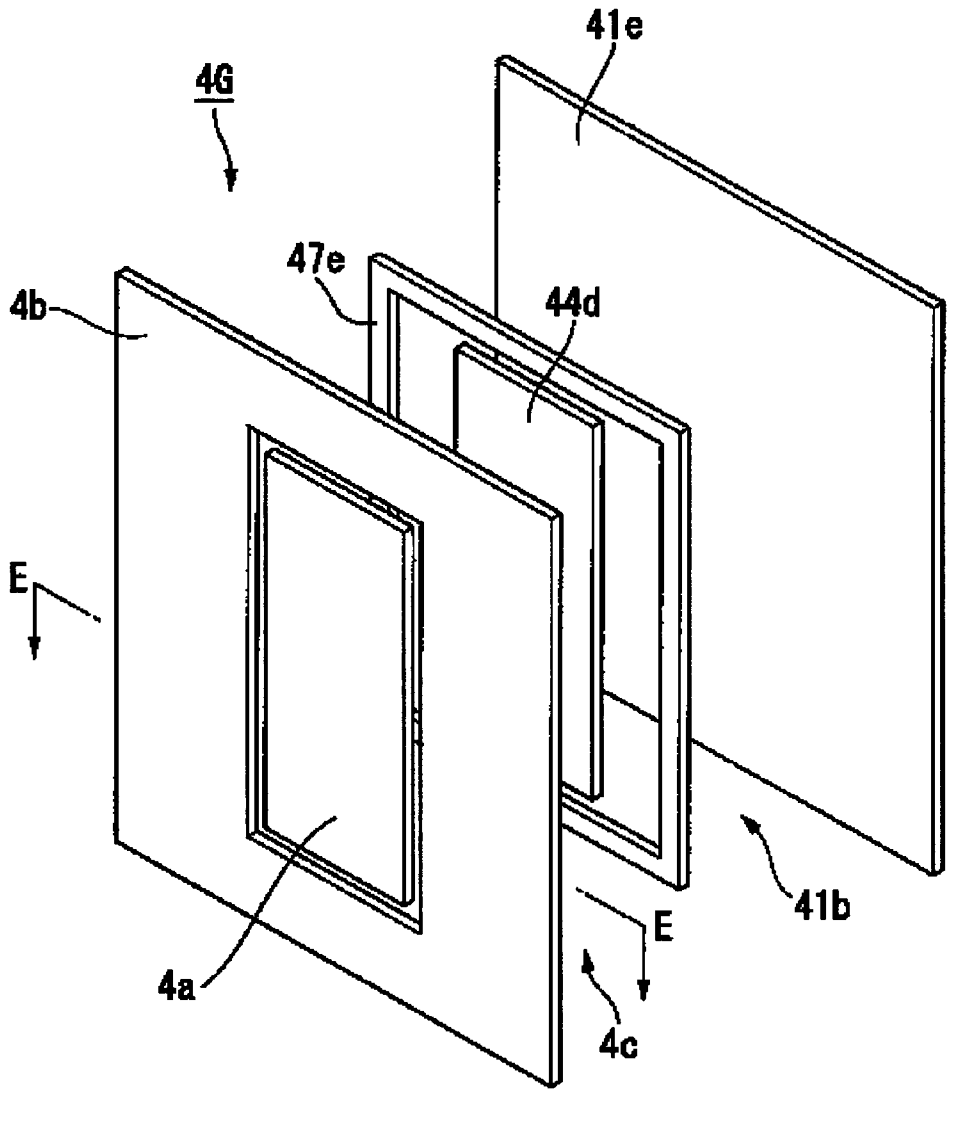
FIG. 20 is an exploded perspective view showing arrangement of electrodes of a remaining amount detection sensor according to a seventh embodiment of the present invention.
Figure 21:
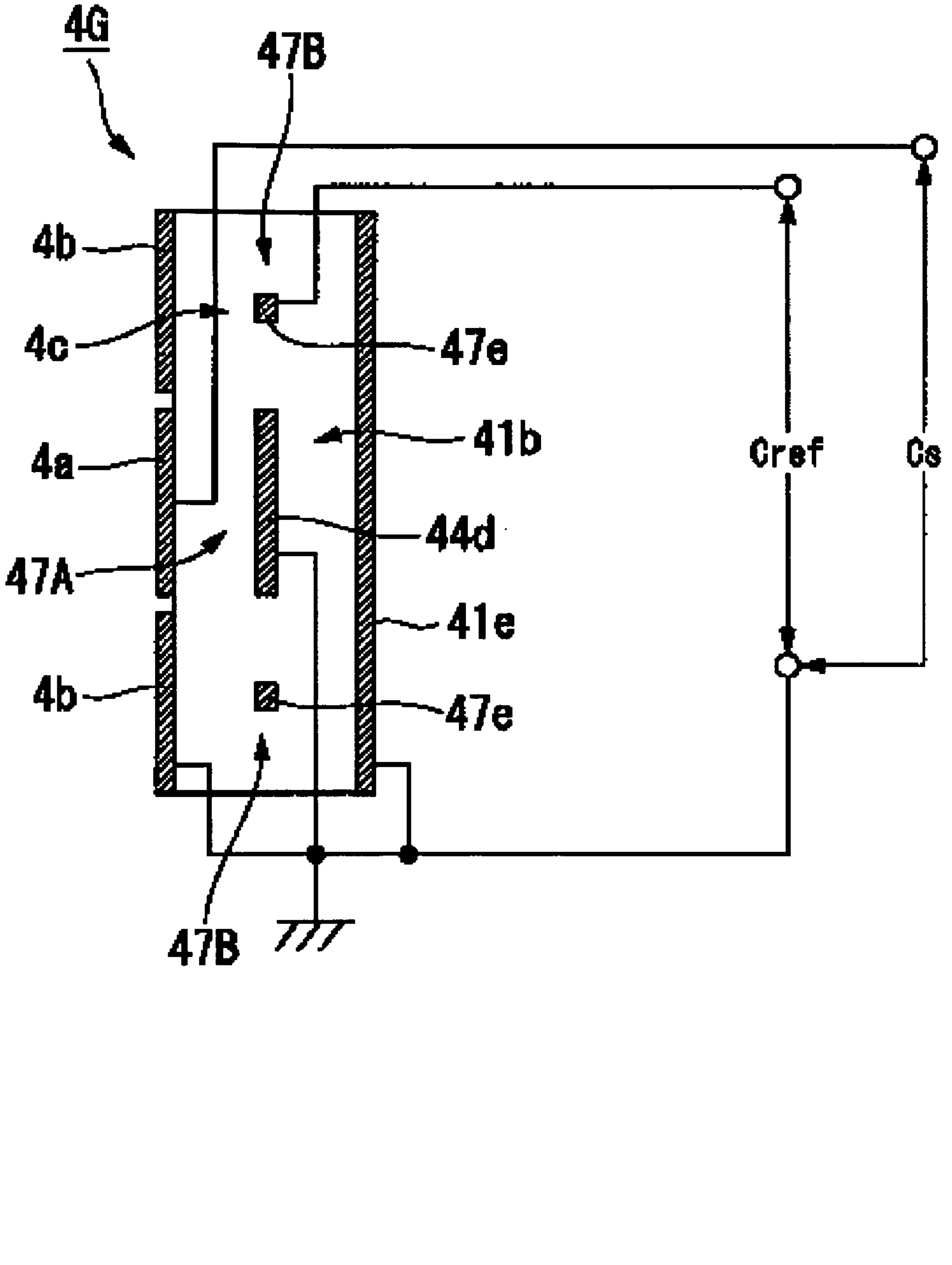
FIG. 21 is a cross-sectional diagram of the remaining amount detection sensor according to the seventh embodiment of the present invention taken along the line E-E of FIG. 20.

FIG. 20 is an exploded perspective view showing arrangement of electrodes of the remaining amount detection sensor according to the seventh embodiment of the present invention. FIG. 21 is a cross-sectional diagram of the remaining amount detection sensor according to the seventh embodiment of the present invention taken along the line E-E of FIG. 20.

As shown in FIGS. 20 and 21, a remaining amount detection sensor 4G according to the seventh embodiment of the present invention includes a reference electrode 47e having a rectangular loop shape surrounding the outer periphery of the guard electrode 44d, in place of the pair of reference electrodes 46e of the remaining amount detection sensor 4F according to the sixth embodiment. Hereinafter, the differences from the sixth embodiment will be mainly described.

The reference electrode 47e is formed so that the combined capacitance formed between the guard electrodes 4b and 41e opposed to each other is set to the same capacitance $C_{ref}$ as that of the pair of reference electrodes 46e according to the sixth embodiment. As a result, the reference part 47B is formed so as to surround the detection part 47A similar to the detection part 46A on the outer peripheral side.

Accordingly, the measurement as to the remaining amount detection can be performed in the same manner as in the sixth embodiment.

In this case, the reference part 47B surrounds the outer peripheral side of the detection part 47A, so the environmental conditions of the outer peripheral portion of the detection electrode 4a affect the reference parts 47B in almost the same manner. As a result, even when the environmental conditions are different on the outer peripheral portion of the detection part 47A, the effects on the detection accuracy of the remaining amount detection can be reduced. Accordingly, the remaining amount detection can be performed with high accuracy.

Note that the components described in the above embodiments and modified examples can be used in appropriate combination thereof within the technical idea of the present invention, as long as the combination is possible from the technical point of view.

For example, the remaining amount detection sensor 4 according to the first embodiment may be used for detecting a remaining amount of ink contained in the main tank 9.

Further, the remaining amount detection sensor 4 may be formed of a multilayer printed board, or the remaining amount detection circuit part 11 may be formed on the same board. The reference capacitor 31 has a structure different from that of the remaining amount detection sensor 4, so the effects of the environmental fluctuation vary, but the wiring is shortened, thereby obtaining a remaining amount detection sensor resistant to noise.

Further, in place of the remaining amount detection sensor 4 of the ink-jet printer 100 according to the first embodiment, the remaining amount detection sensors 4D, 4E, 4F, and 4G according to the fourth to seventh embodiments, respectively, can be used. The structures for arrangement of the electrodes of the remaining amount detection sensors can be applied also to the remaining amount detection sensor 4A according to the second embodiment.

Further, in the descriptions as to the third to seventh embodiments, there is illustrated an example where the remaining amount detection sensors 4D, 4E, 4F, and 4G are each formed by using the three-layered multilayer printed board so as to minimize the number of layers of the conductive patterns. However, in a case where more layers of the conductive pattern can be formed, the second guard electrode and the reference electrode are not necessarily formed in the same plane.

In this case, depending on a position of the second guard electrode and a difference in dielectric constant of the dielectric layer, each capacitance of the reference parts can be changed. In such a case, the area of the second guard electrode or the like is appropriately set, thereby easily setting the combined capacitance to the $C_{ref}$ similar to that of the above: embodiments.

Further, in the above description, the remaining amount detection sensor is described as an example used for an ink-jet printer. This is only an example, and the remaining amount detection sensor may be used for detection of a remaining amount of content of a container for an apparatus used for every purpose as long as the remaining amount of the content of the container can be detected by a change in capacitance.

Further, in the above description, the example where the content of the container is a liquid is illustrated, but the content is not limited to the liquid. The present invention may be used to detect a remaining amount of powder, for example.

What is claimed is:

1. A remaining amount detection sensor which is disposed outside a container to detect a remaining amount of content of the container, the remaining amount detection sensor comprising:

a detection electrode disposed so as to face the container;

a first guard electrode disposed in the same plane as the detection electrode so as to surround an outer periphery of the detection electrode; and a second guard electrode disposed so as to face the detection electrode with a space in at least a range covering the detection electrode, the second guard electrode having the same potential as that of the first guard electrode;

wherein the remaining amount of the content of the container can be detected based on a capacitance to be measured by the detection electrode with the potentials of the first guard electrode and the second guard electrode each being set as a reference potential.

2. An ink-jet printer comprising: an ink-jet head for discharging ink; an ink tank for supplying the ink to the ink-jet head; and a remaining amount detection sensor according to claim 1 disposed outside the ink tank.

3. A remaining amount detection sensor according to claim 1; wherein the detection electrode comprises a plurality of the detection electrodes formed at positions spaced apart from each other; wherein the first guard is in a state of surrounding an outer periphery of each of the plurality of detection electrodes; and wherein the remaining amount of the content of the container can be detected in a plurality of levels based on capacitances to be measured by the plurality of detection electrodes.

4. An ink-jet printer comprising: an ink-jet head for discharging ink; an ink tank for supplying the ink to the ink-jet head; and a remaining amount detection sensor according to claim 3 disposed outside the ink tank.

5. A remaining amount detection sensor according to claim 3; wherein the detection electrode, the first guard electrode, and the second guard electrode are each formed as a conductive pattern of a multilayer printed board; and wherein the multilayer printed board has a remaining amount detection circuit integrally formed thereon for measuring the capacitance of the detection electrode to generate a remaining amount detection output.

6. A remaining amount detection sensor according to claim 3; further comprising: a third guard electrode having the same potential as that of each of the first guard electrode and the second guard electrode, the third guard electrode being disposed so as to face at least one of the first guard electrode and the second guard electrode with a space on an opposite side of the container; and a reference electrode disposed so as to be sandwiched in a range in which one of the first guard electrode and the second guard electrode, and the third electrode are opposed to each other.

7. A remaining amount detection sensor according to claim 1; further comprising: a third guard electrode having the same potential as that of each of the first guard electrode and the second guard electrode, the third guard electrode being disposed so as to face at least one of the first guard electrode and the second guard electrode with a space on an opposite side of the container; and a reference electrode disposed so as to be sandwiched in a range in which one of the first guard electrode and the second guard electrode, and the third electrode are opposed to each other.

8. An ink-jet printer comprising: an ink-jet head for discharging ink; an ink tank for supplying the ink to the ink-jet head; and a remaining amount detection sensor according to claim 7 disposed outside the ink tank.

9. A remaining amount detection sensor according to claim 7; wherein the detection electrode, the first guard electrode, the second guard electrode, the third guard electrode, and the reference electrode are each formed as a conductive pattern of a multilayer printed board; and wherein the multilayer printed board has a remaining amount detection circuit integrally formed thereon for measuring the capacitance of the detection electrode to generate a remaining amount detection output.

10. A remaining amount detection sensor according to claim 7; wherein the second guard electrode is disposed in a range covering each of the detection electrode and the first guard electrode; wherein the third guard electrode is disposed in a range covering the second guard electrode; and wherein the reference electrode is disposed so as to be sandwiched in a range in which the second guard electrode and the third guard electrode are opposed to each other.

11. An ink-jet printer comprising: an ink-jet head for discharging ink; an ink tank for supplying the ink to the ink-jet head; and a remaining amount detection sensor according to claim 10 disposed outside the ink tank.

12. A remaining amount detection sensor according to claim 10; wherein the detection electrode, the first guard electrode, the second guard electrode, the third guard electrode, and the reference electrode are each formed as a conductive pattern of a multilayer printed board; and wherein the multilayer printed board has a remaining amount detection circuit integrally formed thereon for measuring the capacitance of the detection electrode to generate a remaining amount detection output.

13. A remaining amount detection sensor according to claim 7; wherein the reference electrode is disposed in a range in which the first guard electrode and the third guard electrode are opposed to each other; and wherein the reference electrode is disposed in the same plane as the second guard electrode.

14. An ink-jet printer comprising: an ink-jet head for discharging ink; an ink tank for supplying the ink to the ink-jet head; and a remaining amount detection sensor according to claim 13 disposed outside the ink tank.

15. A remaining amount detection sensor according to claim 13; wherein the detection electrode, the first guard electrode, the second guard electrode, the third guard electrode, and the reference electrode are each formed as a conductive pattern of a multilayer printed board; and wherein the multilayer printed board has a remaining amount detection circuit integrally formed thereon for measuring the capacitance of the detection electrode to generate a remaining amount detection output.

16. An ink-jet printer comprising: an ink-jet head for discharging ink; an ink tank for supplying the ink to the ink-jet head; and a remaining amount detection sensor according to claim 15 disposed outside the ink tank.

17. A remaining amount detection sensor according to claim 1; wherein the detection electrode, the first guard electrode, and the second guard electrode are each formed as a conductive pattern of a multilayer printed board; and wherein the multilayer printed board has a remaining amount detection circuit integrally formed thereon for measuring the capacitance of the detection electrode to generate a remaining amount detection output.

18. An ink-jet printer comprising: an ink-jet head for discharging ink; an ink tank for supplying the ink to the ink-jet head; and a remaining amount detection sensor according to claim 17 disposed outside the ink tank.

* * * * *